US011511581B1

(12) United States Patent
Berardi

(10) Patent No.: US 11,511,581 B1
(45) Date of Patent: Nov. 29, 2022

(54) SUSPENSION SYSTEM

(71) Applicant: XTravel Suspension, LLC, Rancho Santa Fe, CA (US)

(72) Inventor: Nestor Alexander Berardi, Temecula, CA (US)

(73) Assignee: XTRAVEL SUSPENSION, LLC, Rancho Santa Fe, CA (US)

( * ) Notice: Subject to any disclaimer, the term of this patent is extended or adjusted under 35 U.S.C. 154(b) by 0 days.

(21) Appl. No.: 17/567,787

(22) Filed: Jan. 3, 2022

Related U.S. Application Data

(60) Provisional application No. 63/277,493, filed on Nov. 9, 2021, provisional application No. 63/202,579, filed on Jun. 16, 2021.

(51) Int. Cl.
*B60G 3/26* (2006.01)

(52) U.S. Cl.
CPC ........ *B60G 3/265* (2013.01); *B60G 2204/143* (2013.01); *B60G 2204/421* (2013.01); *B60G 2204/422* (2013.01)

(58) Field of Classification Search
CPC .............. B60G 3/265; B60G 2204/143; B60G 2204/421; B60G 2204/422
See application file for complete search history.

(56) References Cited

U.S. PATENT DOCUMENTS

| | | |
|---|---|---|
| 2,776,721 A | 1/1957 | Dante |
| 4,145,072 A | 3/1979 | Matschinsky |
| 4,681,342 A | 7/1987 | Goerich |
| 4,705,292 A | 11/1987 | Hespelt et al. |
| 4,756,546 A | 7/1988 | Kubo et al. |
| 4,819,959 A | 4/1989 | Inoue et al. |
| 4,842,296 A | 6/1989 | Kubo |
| 4,863,188 A | 9/1989 | Killian |
| 4,878,688 A | 11/1989 | Kubo |
| 4,930,805 A | 6/1990 | Takata et al. |
| 4,941,677 A | 7/1990 | Matsumoto et al. |
| 4,948,161 A | 8/1990 | Tonomura |
| 4,978,131 A | 12/1990 | Edahiro et al. |
| 5,026,091 A | 6/1991 | Lee |
| 5,048,860 A | 9/1991 | Kanai et al. |
| 5,100,165 A | 3/1992 | Hespelt |
| 5,116,076 A | 5/1992 | Moll |
| 5,374,076 A * | 12/1994 | Lee .......................... B60G 3/26 280/124.145 |

(Continued)

FOREIGN PATENT DOCUMENTS

| | | | |
|---|---|---|---|
| CN | 101474951 B | 12/2010 | |
| CN | 105882341 A * | 8/2016 | ............... B60G 3/00 |

(Continued)

*Primary Examiner* — Darlene P Condra
(74) *Attorney, Agent, or Firm* — Umberg Zipser LLP

(57) ABSTRACT

Various suspension systems for vehicles are described that preferably comprise a multi-link suspension where one or more of the links can move independently of the other links. The multiple independent links are connected to an upright, vertical load reaction that is decoupled from horizontal load reaction, thus delivering a more comfortable ride and reduced feedback to the driver or operator of the vehicle. By eliminating that external feedback using the inventive subject matter discussed herein, vehicles can be safer and easier to control in all circumstances.

22 Claims, 33 Drawing Sheets

(56) References Cited

U.S. PATENT DOCUMENTS

| | | | |
|---|---|---|---|
| 5,507,510 A | 4/1996 | Kami et al. | |
| 5,627,751 A * | 5/1997 | Davis | B60G 17/0185 |
| | | | 280/5.506 |
| 5,697,633 A | 12/1997 | Lee | |
| 6,056,303 A * | 5/2000 | van der Knaap | B60G 17/02 |
| | | | 280/124.1 |
| 6,123,351 A | 9/2000 | Bruehl | |
| 7,048,286 B2 | 5/2006 | Eppelein | |
| 7,168,719 B2 | 1/2007 | Gerrard | |
| 7,258,355 B2 | 8/2007 | Amano | |
| 7,350,792 B1 * | 4/2008 | Garman | B60G 9/027 |
| | | | 280/93.502 |
| 7,380,805 B1 | 6/2008 | Turner | |
| 7,591,337 B2 | 9/2009 | Suhre et al. | |
| 7,784,807 B2 | 8/2010 | Brandl et al. | |
| 7,891,684 B1 | 2/2011 | Luttinen et al. | |
| 7,954,835 B2 | 6/2011 | Nakamura et al. | |
| 7,963,538 B2 | 6/2011 | Roland et al. | |
| 8,240,687 B2 | 8/2012 | Kurosu | |
| 8,444,160 B2 | 5/2013 | Okamoto et al. | |
| 8,646,787 B2 | 2/2014 | Langhoff et al. | |
| 9,205,874 B2 | 12/2015 | Schindler et al. | |
| 9,216,624 B1 | 12/2015 | Luttinen et al. | |
| 9,238,394 B2 | 1/2016 | Leibl | |
| 9,399,378 B2 | 7/2016 | Goldberg et al. | |
| 9,434,230 B2 | 9/2016 | Schmitt et al. | |
| 9,469,174 B2 | 10/2016 | Mohrlock et al. | |
| 9,545,827 B2 | 1/2017 | Goldberg et al. | |
| 9,561,818 B2 * | 2/2017 | Uchihara | B62D 7/18 |
| 9,579,942 B2 | 2/2017 | Allen et al. | |
| 9,669,869 B2 | 6/2017 | Kageyama et al. | |
| 9,844,991 B2 | 12/2017 | Dusini et al. | |
| 9,944,142 B2 | 4/2018 | Mohrlock | |
| 10,315,696 B2 | 6/2019 | Gordon | |
| 10,350,955 B2 | 7/2019 | Langhoff et al. | |
| 10,442,263 B2 | 10/2019 | Gordon | |
| 10,457,140 B2 * | 10/2019 | Bennett | B62K 5/01 |
| 11,192,414 B1 | 12/2021 | Berardi | |
| 2005/0247502 A1 | 11/2005 | Ziech et al. | |
| 2009/0218783 A1 | 9/2009 | Brandl et al. | |
| 2012/0043736 A1 | 2/2012 | Okamoto et al. | |
| 2018/0281853 A1 | 10/2018 | Gordon | |
| 2019/0381847 A1 | 12/2019 | Kumagai et al. | |
| 2020/0148264 A1 | 5/2020 | Daikoku et al. | |
| 2021/0402875 A1 * | 12/2021 | Pham | B62D 7/14 |

FOREIGN PATENT DOCUMENTS

| | | | | |
|---|---|---|---|---|
| CN | 110861455 A | | 3/2020 | |
| CN | 212046766 U | * | 12/2020 | |
| DE | 1938850 A1 | | 5/1970 | |
| DE | 1938850 B2 | | 1/1976 | |
| DE | 19544276 A1 | | 11/2005 | |
| DE | 19751754 A1 | | 1/2011 | |
| DE | 10016887 | | 6/2011 | |
| DE | 102010030292 A1 | | 12/2011 | |
| DE | 102015014027 A1 | | 5/2017 | |
| DE | 102016212662 A1 | | 1/2018 | |
| DE | 102014003220 A1 | | 2/2019 | |
| EP | 1741575 B1 | | 1/2007 | |
| EP | 1741576 B1 | | 1/2007 | |
| FR | 2753931 A1 | * | 4/1998 | B60G 21/051 |
| GB | 1285047 A | | 8/1972 | |
| GB | 1285048 A | | 8/1972 | |
| GB | 1571030 A | | 6/1979 | |
| GB | 2246329 A | | 4/1992 | |
| GB | 2270508 B | | 1/1996 | |
| JP | H0574911 U | | 10/1993 | |
| JP | 2823854 B2 | | 11/1998 | |
| KR | 1020080054809 A | | 6/2008 | |
| WO | 2014039981 A1 | | 3/2014 | |
| WO | 2019078120 A1 | | 4/2019 | |

* cited by examiner

SUSPENSION SYSTEM

This application claims priority to U.S. provisional patent application having Ser. No. 63/277,493 filed on Nov. 9, 2021. This and all other referenced extrinsic materials are incorporated herein by reference in their entirety. Where a definition or use of a term in a reference that is incorporated by reference is inconsistent or contrary to the definition of that term provided herein, the definition of that term provided herein is deemed to be controlling.

FIELD OF THE INVENTION

The field of the invention is suspension systems for vehicles, and specifically, off road vehicles with extensive suspension travel.

BACKGROUND

The following description includes information that may be useful in understanding the present invention. It is not an admission that any of the information provided herein is prior art or relevant to the presently claimed invention, or that any publication specifically or implicitly referenced is prior art.

While prior art inventions exist that utilize four link or multi-link vehicle suspensions, those known to Applicant all fail to disclose the arcuate telescoping geometry that allow for a non-back-drivable steering system.

For example, U.S. Pat. No. 4,863,188 to Killian (published Sep. 5, 1989) describes a four-link suspension system for the steered wheels of a vehicle that is dependent on multiple elements and therefore unable to provide reduction in external forces delivered to the operator of the vehicle. Such elements include, for example, (1) a spring and damper system which creates a transverse force in the multi-link suspension by being "aligned substantially parallel to the axis of rotation for the wheel when the vehicle is in a straight-ahead driving position", (2) being attached to one of the independent suspension arms, and (3) a design with Ackermann effect, such that while the vehicle is turning "the proportionate transverse element of force assumes a lower value for a steering angle on the inside curve than for a steering angle on the outside of the curve."

As another example, U.S. Pat. No. 9,561,818 to Kaisha (published 2016) also discloses a four-link suspension apparatus for steered wheels that requires a specific algorithm for the selection and relationship of the four outboard pivot points on the knuckle to reduce the amount of power used by a power steering system and therefore increase fuel efficiency. Specifically, Kaisha describes that the line formed by the upper two pivot points on the knuckle (line AP2, Kaisha FIG. 2) must have a specific relationship to the line formed by the lower two pivot points on the knuckle (line AP1, Kaisha FIG. 2), and that relationship is of one line increasing in angle during steering more than the other line when both relate to the chassis centerline. Kaisha explicitly states this relationship must be maintained by saying a rate of moving amount toward the vehicle inside to moving amount toward the vehicle front of the second extended line AP2 is more than the rate of the first extended line AP1. This is seen in Kaisha FIG. 2 where the first extended line AP1 and the second extended line AP2 extend in open-front shape such that these lines separate from each other toward the vehicle front, and "an inclination angle of the second extended line AP2 to the vehicle baseline L which extends in the vehicle front-rear direction at the vehicle center is more than "the inclination angle of the first extended line AP1 to the vehicle baseline L." Kaisha's system, while potentially increasing fuel efficiency, is unable to provide a reduction in external forces delivered to the operator of the vehicle.

All publications identified herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

Thus, there is still a need for suspension systems configured to provide a reduction in external forces delivered to the operator of the vehicle.

SUMMARY OF THE INVENTION

The inventive subject matter provides apparatus, systems and methods for suspension systems for vehicles. Vehicles could include, for example, model or remote-controlled vehicles such as radio-controlled cars, trucks or other vehicles, autonomous vehicles, or passenger vehicles such as automobiles, trucks, all-terrain vehicles, military or fleet vehicles, and snowmobiles.

The vehicle comprises a chassis to which a suspension system can be coupled.

Exemplary suspension systems are described in U.S. patent application having Ser. No. 17/144,654, filed on Jan. 8, 2021 (now U.S. Pat. No. 11,192,414) and U.S. patent application having Ser. No. 17/499,778 filed on Oct. 12, 2021, and are briefly described below. Such systems preferably comprise a multi-link suspension system, where each of the links can move independently or in concert/harmony with each of the other links. However, in other contemplated multi-link suspension systems, one or more of the links may move together with another of the links, such as an A-arm where the links are connected, for example. Still, in other embodiments, it is contemplated that any number of the links of the multi-link suspension system may move in concert with one another.

The inventive subject matter described herein provides a novel solution to the inherent problems with suspension designs of the prior art. The inventive subject matter provides a drastic reduction of feedback to the driver/operator in rough terrain without the aid of a stabilizer or damper. This is the result of the virtual pivot of the steering system having little to no movement along the x axis of the vehicle—see FIG. 1. The inventive subject matter also provides a novel way to mount a spring and damper system ("spring damper assembly") to change handling dynamics under rough terrain. Unlike in a standard suspension where the suspension reaction to vertical loads cannot be de-coupled to suspension reaction to horizontal loads, the multi-link suspension system of the inventive subject matter can provide multiple independent links connected to an upright, vertical load reaction that is decoupled from horizontal load reaction, thus delivering a more comfortable ride and reduced feedback to the driver.

The inventive subject matter described herein allows for the reduction, and in some cases, elimination of externally created frontal plane steering forces resulting in external steering angle change in vehicle suspensions by using an arcuate telescoping design of a four-link suspension that results in geometrically isolated load paths. This is especially advantageous in high travel suspensions for off-road type vehicles, but the improvements described herein are applicable to all steered vehicles including autonomous vehicles.

In contrast, when a vehicle having a traditional suspension encounters road surface irregularities, bumps, obstacles, or even landing the vehicle after a jump in a nose down position, some component of that encountered force must be reacted to by the steering system of the vehicle. This unexpected and abrupt external feedback to the steering wheel due to obstacles seen or unseen is the definition of losing control of a vehicle and can be dangerous.

By eliminating that external feedback using the inventive subject matter discussed herein, vehicles can be safer and easier to control in all circumstances. As briefly described above, the inventive suspension systems and methods described herein decouple the encountered loads at the vehicle's tire(s) from the steering control and system, which otherwise could impart a steering angle change. This novel suspension is preferably achieved by an arrangement of multiple links replacing each conventional A-arm, where the links and the steering attachment points are constrained by a geometric formula that preferably maintains the wheel centerline generally on the same line while the steering is articulated. An inside-out load analysis reveals that because the steered wheels move an insignificant amount off the spindle line, or balance point path, during articulation, whatever forces are encountered by the wheel are transmitted through the suspension links, and not the steering link. When the center of the steered wheel remains on the spindle line while the vehicle is steered, then by definition, any external forces that are perpendicular to that line will have zero effect on steering the vehicle.

Because the tire(s) are not impacted or turned by outside forces to the tire(s), those forces do not have to be resisted at the steering wheel by the operator of the vehicle. This has the added benefit of reducing the need for power steering or power assisted steering, which reduces the vehicle's weight and complexity, and can greatly increase reliability. The geometric decoupling of the longitudinal forces (FIG. 1, X) from the transverse forces (FIG. 1, Y) has also shown improvements in operator comfort and fatigue. While the described systems and methods are most advantageously used to eliminate feedback in high travel, off road vehicles, the inventive subject matter described herein can alternatively be tuned to allow for partial feedback. For example, such partial but reduced feedback may be desired by an operator of a vehicle on a pavement course who requires enough feedback to feel the road surface and anticipate handling corrections.

Various objects, features, aspects and advantages of the inventive subject matter will become more apparent from the following detailed description of preferred embodiments, along with the accompanying drawing figures in which like numerals represent like components.

DETAILED DESCRIPTION

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

Figure 1:
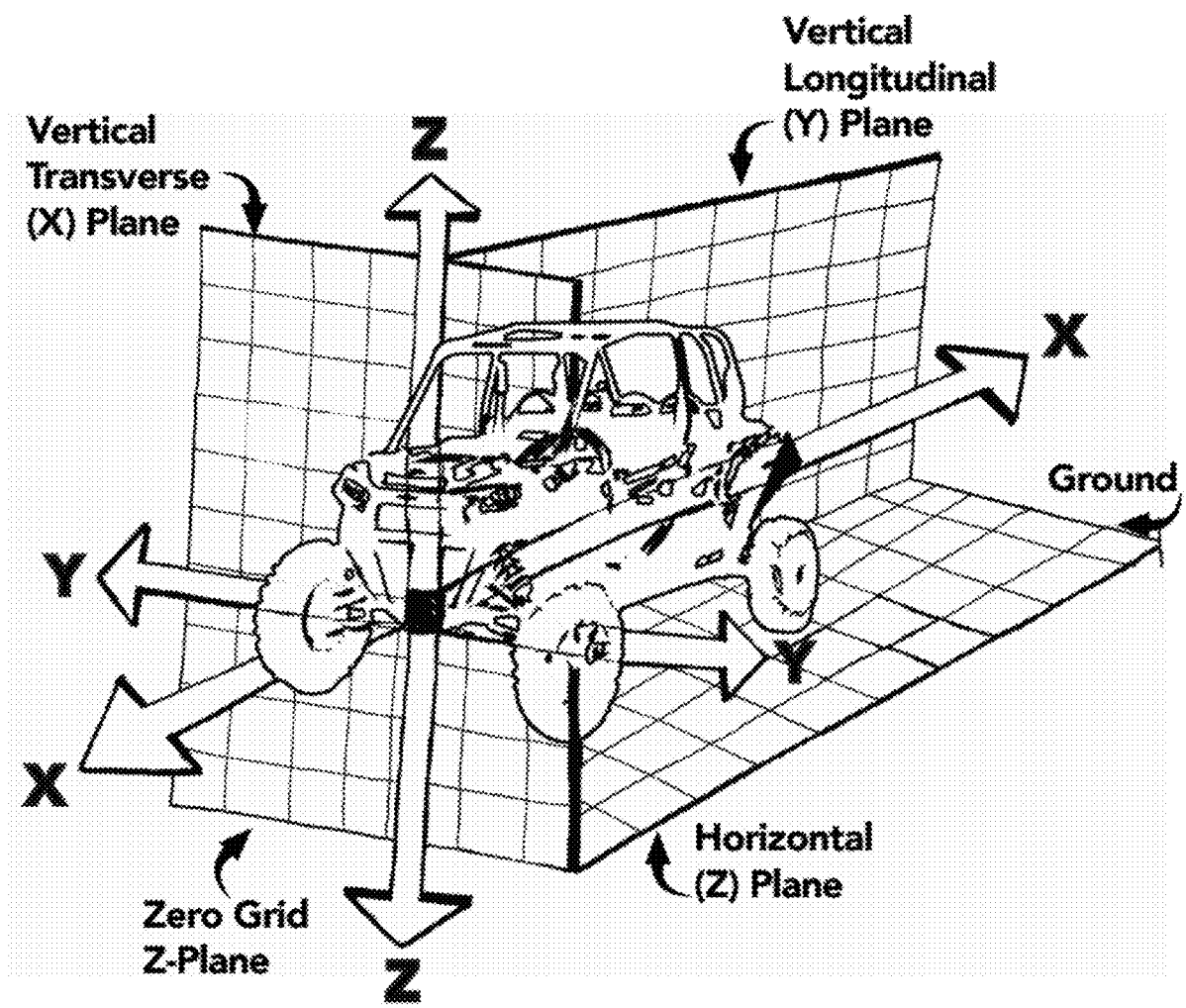
FIG. 1 illustrates vertical transverse, vertical longitudinal, and horizontal planes as used relative to a vehicle.

FIG. 1 illustrates vertical transverse, vertical longitudinal, and horizontal planes as used relative to a vehicle.

Figure 2A:
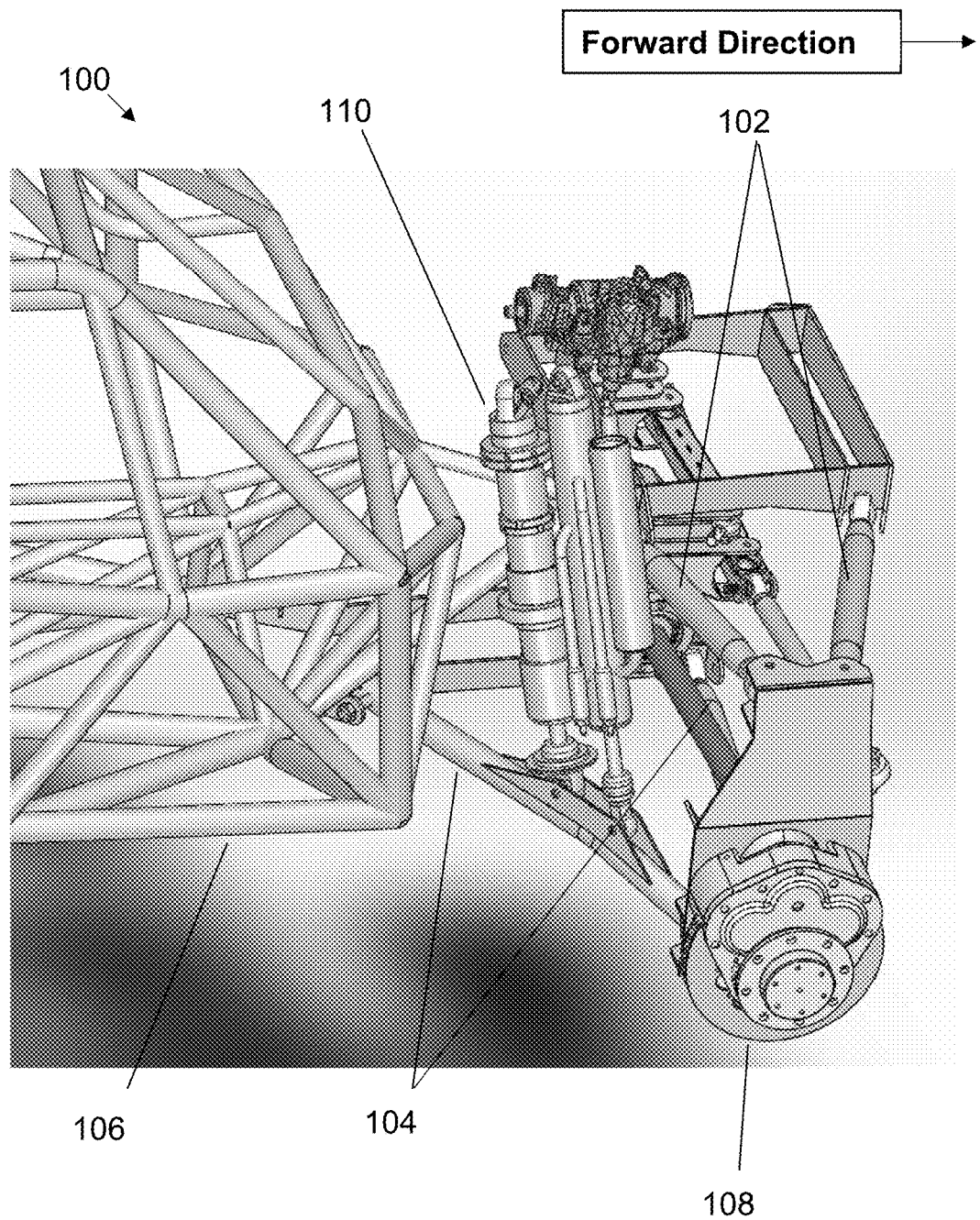
FIG. 2A illustrates a front, perspective view of one embodiment of a suspension system.
Figure 2B:
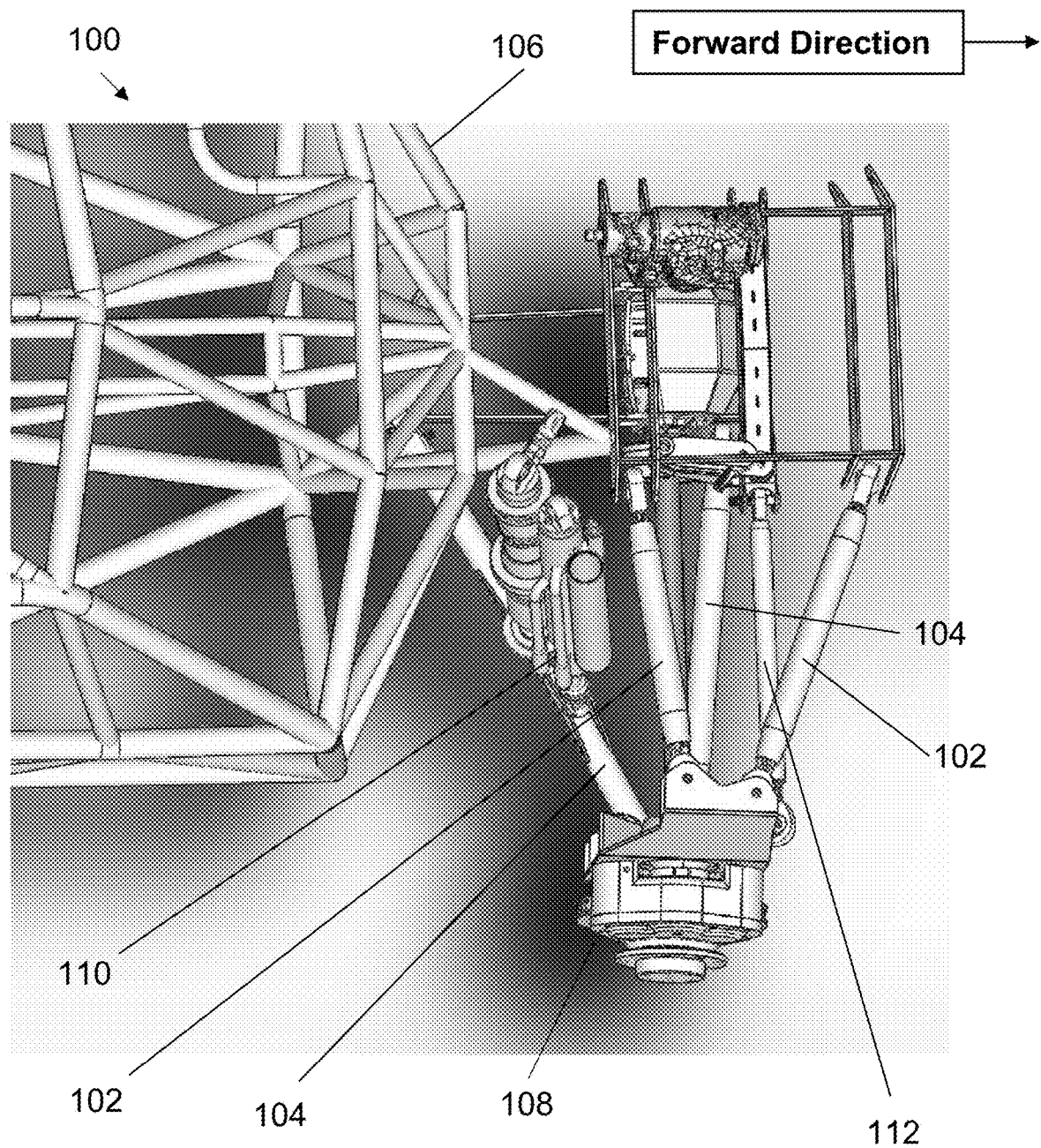
FIG. 2B illustrates a top view of the suspension system of FIG. 2A.

Preferred suspension systems comprise a plurality of linkages or links that couple a chassis of the vehicle to a wheel mount or knuckle. For example, as shown in FIGS. 2A-2B, a suspension system 100 can comprise four links (two upper links 102 and two lower links 104) that couple the knuckle 108 with the chassis 106, with two separate and independent lower links 104 (front and back) and two separate and independent upper links 102 (front and back). In such embodiments, it is preferred that each of the links are mounted to the knuckle 108 and chassis 106, and are mounted to allow each link to move or pivot independently of the other links and allow the links to be rotatably extensible.

Each of the upper and lower links 102, 104 preferably attaches to the knuckle 108 at a distinct point, meaning that each of the upper and lower links 102, 104 attaches to the knuckle 108 at a distinct and separate location from the others of the upper and lower links 102, 104. It is also preferred that each of the upper and lower links 102, 104 attaches to the vehicle's chassis 106 at a distinct point.

In some embodiments, it is contemplated that each of the upper and lower links 102, 104 couples to the knuckle 108 via a spherical ball joint to permit radial motion and allow each of the upper and lower links 102, 104 to move or pivot independently of the other links. In such embodiments, it is preferred that the links may be secured to the spherical ball joint via one or more fasteners. While bolts are preferred, any commercially suitable fasteners could be used that are configured to withstand the forces and stresses encountered when the vehicle is driven.

However, in other contemplated embodiments, it is contemplated that the pair of upper links 102 or the pair of lower links 104 could comprise an A-arm or another configuration where the pair of links are connected together and therefore move or pivot in concert. In such embodiments, others of the links may comprise independently movable links where each of the links may move or pivot independently of the other links unlike an A-arm. Thus, for example, where the lower links comprise an A-arm, the upper links may comprise independently movable links, or vice versa. Preferably, in such embodiments, the spring damper assembly 110 may be mounted to one of the independently movable links, rather than the A-arm.

It is further contemplated that a fifth link 112 (e.g., tie rod) could be used to connect the steering rack/assembly (system) to the knuckle 108 to thereby allow for steering of the vehicle. The fifth link 112 is also preferably mounted to the knuckle 108 at a distinct location and independently of the other four links.

In preferred embodiments, the suspension system 100 utilizes multiple links for an upper or lower corner, causing the steered wheel rotation point to articulate in and out from the centerline of the chassis 106 in a telescoping manner while the steered wheel changes angle, instead of rotating about an axis commonly called a kingpin axis. This is further discussed below. This telescoping is accomplished by defining the paths of two arcs to converge at a prescribed distance, and then arrange the width of the hub and the length of a spindle arm at a calculated distance perpendicular to the distance between two of the links which converge on their center in the initial condition of centered steering. In this manner, an arcuate telescoping system is generated, whereby two converging arcs connected by a third line of defined length, provide a system that moves in and out in a linear fashion instead of rotating about a point.

Multiple interconnected independent variables, such as the length of the two links, the length of the hub or upright, the location and width of the steering rack or steering gear system, and the amount of steering desired, can be chosen. After those variables are defined, the length of the fifth link 112 (steering linkage), and the length of the steering, and the length of the spindle are calculated. As discussed further below, the geometric calculation can then be plotted, and fine adjustments can be made to improve the desired effect, which is the end of the spindle, or the centerline of the wheel, diverges as little as possible from the spindle line (or balance point path). It is also important to note that intelligent choice of arcuate telescoping lengths mean a suspension can be designed such that there is no change in vehicle track width when measured at the contact patch, as the upper link 102 can shorten more than the lower link 104, resulting in both (1) a camber gain which is desired in cornering and (2) no effective track width change in the location of the tire contact patch.

As used herein, the terms "spindle line" and "balance point path" are used semi-interchangeably and refer to the same geometric line that connects the center of the steered left wheel to the center of the steered right wheel when the steering wheel is centered and the vehicle is ready to be steered directly ahead. This line dictates the ideal path for the arcuate telescoping function of the multi-link design. When the center of the steered wheel remains on the spindle line while the vehicle is steered, then by definition, any forces that are perpendicular to that line will have zero effect on steering the vehicle.

In FIGS. 3A-3F, one embodiment of an upper part of a front suspension 200 is shown having equal length front and rear links 222, 224. While an infinite number of configurations including different dimensions of the components, the below discussion and the figures are based on the following dimensions.

In this example, the chassis 240 is a box having a length of 90 cm and a width of 45 cm, with 90 cm being the distance between the suspension inboard attachment points 205, 206. The opposite side of the chassis 240 has inboard attachment points 295, 296. The suspension links 222, 224 each have a length of 90 cm. The hub (201 to 202) at the outboard end of the suspension 200 has a length of 20 cm. The steering rack 232 has a width of 35 cm and is located 22.5 cm back from the initial spindle line toward the rear of the chassis 240. The steering arm on the outboard hub (202 to 212) has a length of 10 cm back from point 202. Based on the above dimensions, the tie rod 226 must have a length of 72 cm and the spindle length to wheel center (220A to 220B) is 17.94 cm. For the example as detailed numerically above, it is important to remember that the relationship between the points is what provides the desired functionality of the arcuate telescoping geometry resulting in a non-backdrivable steering system. For the embodiment detailed above and shown in FIGS. 3A-3F, when the relationship is defined in a ratio to the width between the inboard suspension pick up points (205 and 206), the percentages would be: Chassis Frame-rail Width 0.50 (50%), Chassis Inboard Pickup Points Width 1.00 (100% by definition), Half of Track Width 1.28 (128%), Tire CL to Edge of Chassis 1.03 (103%), Upper Link Front 0.89 (89%), Upper Link Rear 0.89 (89%), Upright Top Length 0.22 (22%), Spindle Length as graphed later at 3 different lengths of 0.21 (21%), 0.23 (23%), 0.24 (24%), Steering Rack Distance Behind Spindle Line 0.22 (22%), Steering Rack Width 0.39 (39%), and a Tie Rod Length 0.86 (86%).

Figure 3A:
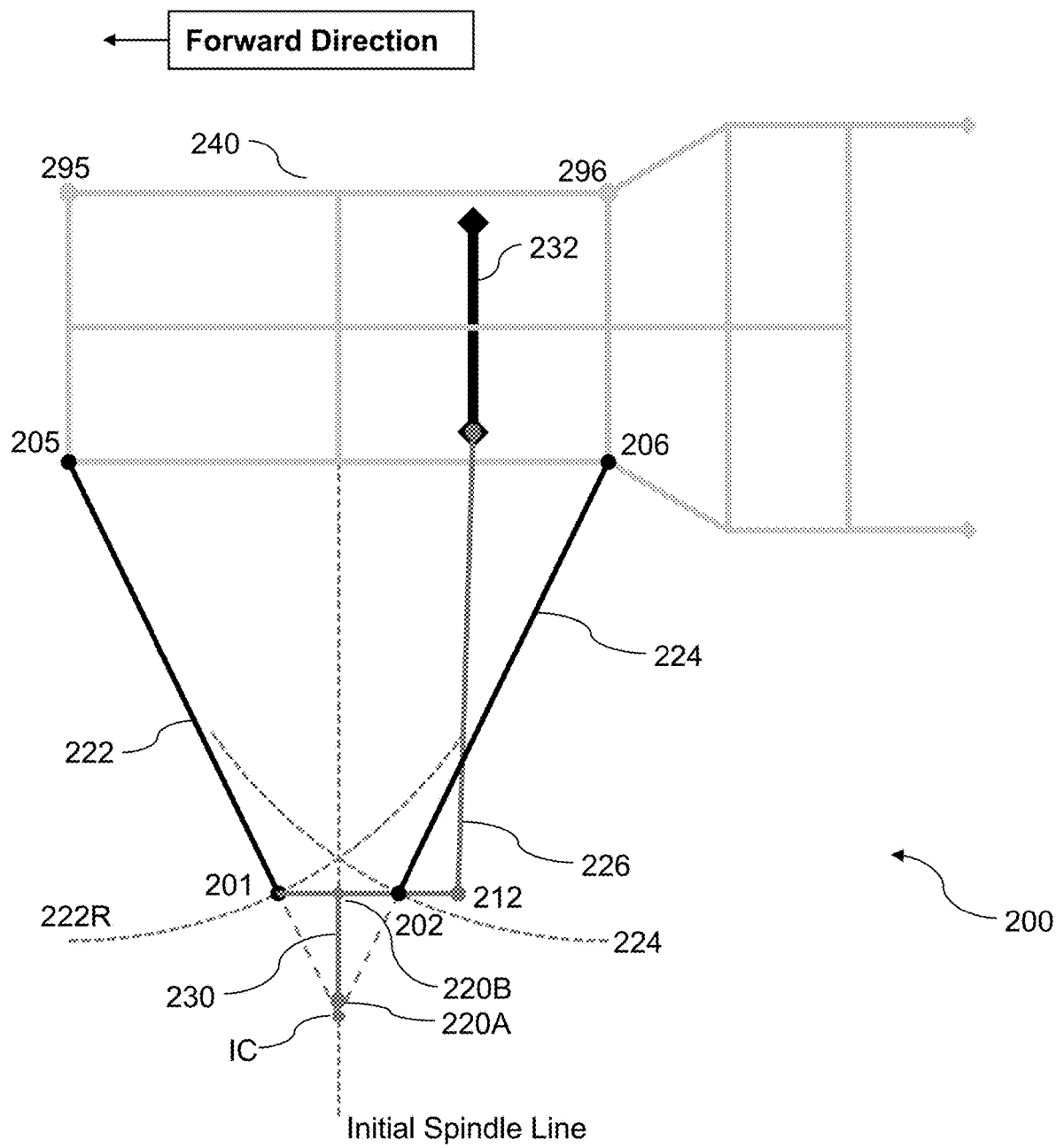
FIG. 3A illustrates a top view of a diagram of one embodiment of an upper part of a front suspension having equal length front and rear links.

FIG. 3A illustrates an overhead view of the suspension 200 turning zero degrees (i.e., wheel straight ahead). A first upper link 222 is defined by the line extending between points 201 and 205, with point 201 being where the first upper link 222 couples with the knuckle 230 and point 205 being where the first upper link 222 couples with the chassis 240. A second upper link 224 is defined by the line extending between points 202 and 206, with point 202 being where the second upper link 224 couples with the knuckle 230 and point 206 being where the second upper link couples with the chassis 240. As discussed above, in this example, the first upper link 222 and the second upper link 224 comprise the same length, although suspensions having links of different lengths are also contemplated and discussed below. Dashed line 222R illustrates the path swept by link 222 as the vehicle is steered, and dashed line 224R illustrates the path swept by link 224 during steering.

The hub/knuckle/upright is defined by the points 201, 202, 212, 220A and 220B. In a given depiction those points are meant to act as if on a rigid body, with no change in their relationship even as the group of points changes orientation with respect to the chassis 240. The spindle is meant to be defined as a projection off the hub/knuckle/upright which represents the rotational axis of the wheel and is defined by points 220A to 220B, with the wheel centered at 220A. A tie rod 226 connects the knuckle 230 at point 212 to the steering rack 232 to allow steering of the wheel of the vehicle.

The instant center IC is a hypothetical point where hypothetical lines extending along each of the first upper link 222 and the second upper link 224 converge.

It is critical that the triangle formed by points 201, 202, and 220A comprises an isosceles triangle or approximately so, with line 201-220A and line 202-220A being approximately equal in length. This specific relationship of an isosceles triangle defined by the points where the links 222, 224 mount to the knuckle 230 and the wheel centerline point 220A at the end of the spindle arm allows for a mechanical bind to be created that eliminates feedback to the steering wheel as the wheel travels or encounters obstacles.

As used above, the term "approximately" is defined to mean within 2 cm of distance for the general sizes of chassis and suspension described herein or within 7.0%, more preferably within 5.0%, of a distance between the inboard pickup points, and within 3.5%, more preferably within 2.5%, of the initial spindle line, so if two lines are approximately equal, this means their lengths are within 2 cm of one another or within 7.0% of the distance between the inboard pickup points. The variation of the lengths of the lines forming the isosceles or near-isosceles triangle will depend on the length of line 205-206, the distance between the points 205, 206 where the two upper links 222, 224 couple to the chassis 240. As a distance between the points 205, 206 becomes greater, less variance from ideal for the length 220A to 220B will be tolerated.

As the tire pivots (steered left or right) causing movement of links 222, 224, the wheel centerline point 220A will travel back and forth along the initial spindle line (i.e., toward and away from the chassis 240) and will remain on or within 2.0 cm, and ideally within 6 mm over a +/−30 deg steering range of the initial spindle line. As used herein, the "initial spindle line" is defined as the spindle line of the knuckle 230 when the wheel is straight ahead.

Figure 3B:
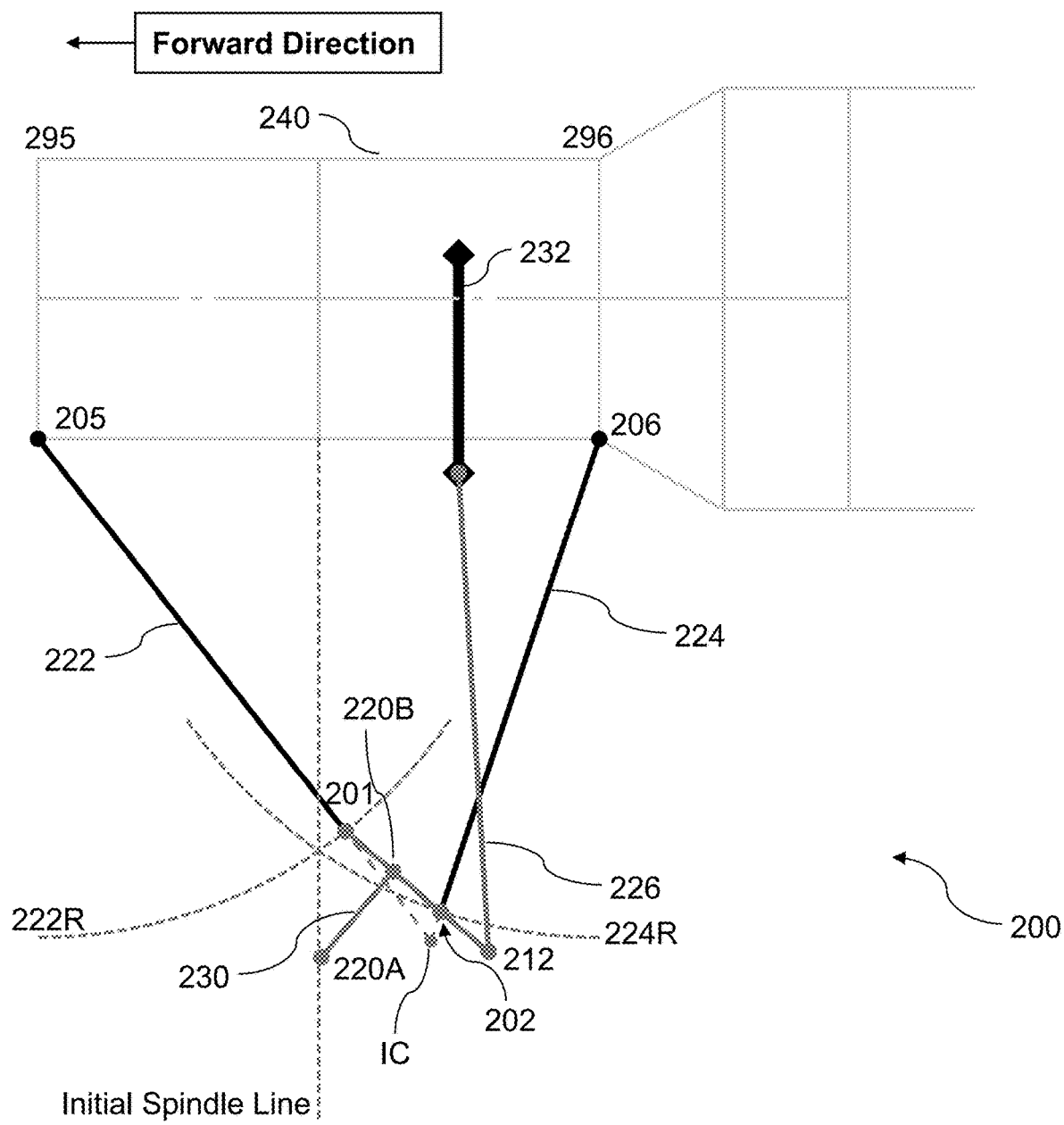
FIG. 3B illustrates a top view of a diagram of the suspension of FIG. 3A turning right 40 degrees.

FIG. 3B illustrates an overhead view of the suspension 200 turning right 40 degrees. As shown, when the wheel turns, the instant center IC where the hypothetical lines extending along each of the first upper link 222 and the second upper link 224 converge moves to the right and away from the initial spindle line. Importantly, the triangle formed by points 201, 202 and 220A still comprises an isosceles triangle or approximately so, with line 201-220A and line 202-220A being approximately equal. Furthermore, as can be seen, the wheel centerline point 220A remains on or within 2.0 cm, and ideally within 6 mm over a +/−30 deg steering range, of the initial spindle line and has traveled along the initial spindle line toward chassis 240 when compared with FIG. 3A.

Figure 3C:
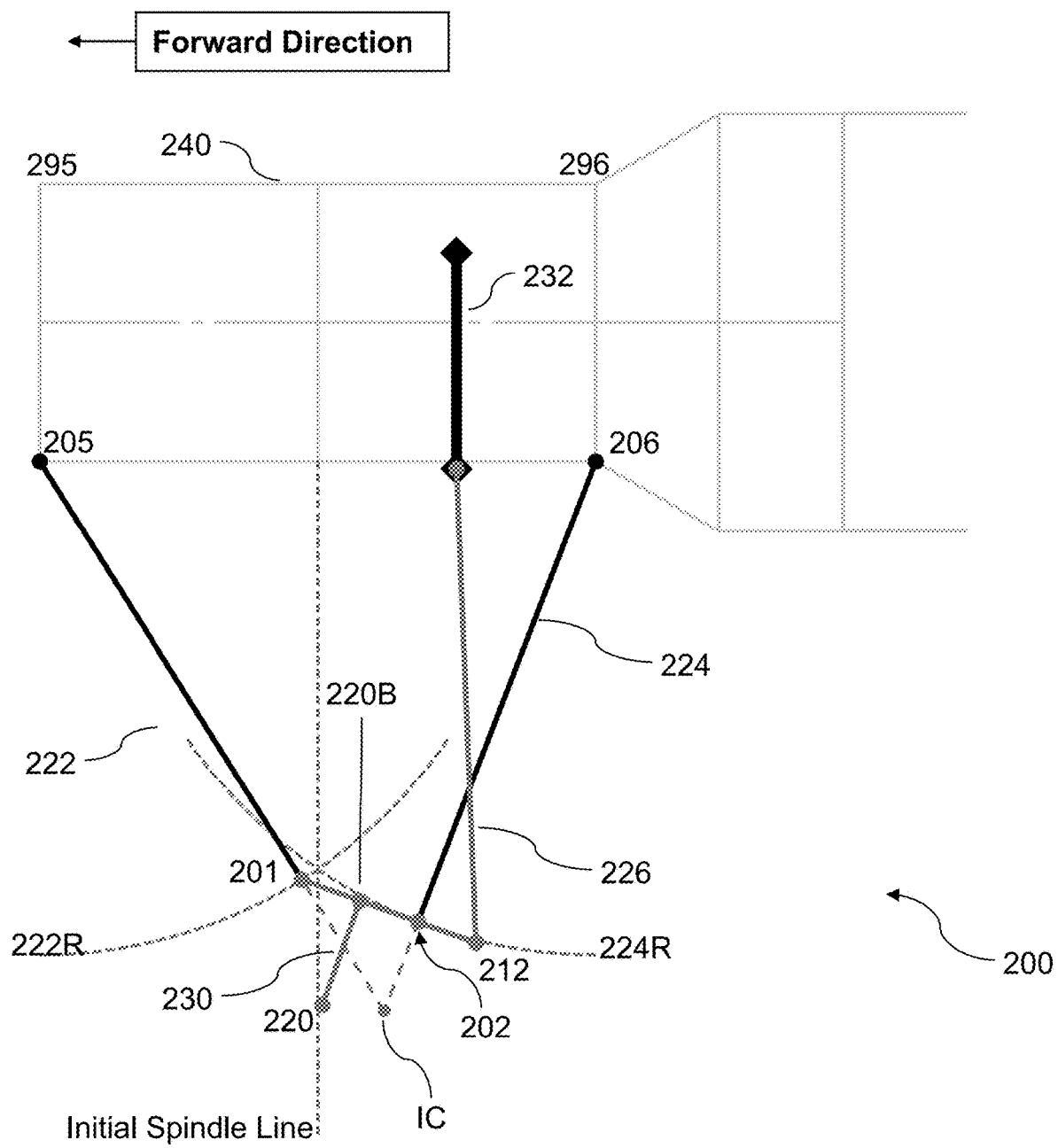
FIG. 3C illustrates a top view of a diagram of the suspension of FIG. 3A turning right 20 degrees.

FIG. 3C illustrates an overhead view of the suspension 200 turning right 20 degrees. Importantly, the triangle formed by points 201, 202 and 220A still comprises an isosceles triangle or approximately so, with line 201-220A and line 202-220A being approximately equal. Furthermore, as can be seen, the wheel centerline point 220A remains on or within 2.0 cm, and ideally within 6 mm over a +/−30 deg steering range, of the initial spindle line and has traveled along the initial spindle line away from chassis 240 when compared with FIG. 3B.

Figure 3D:
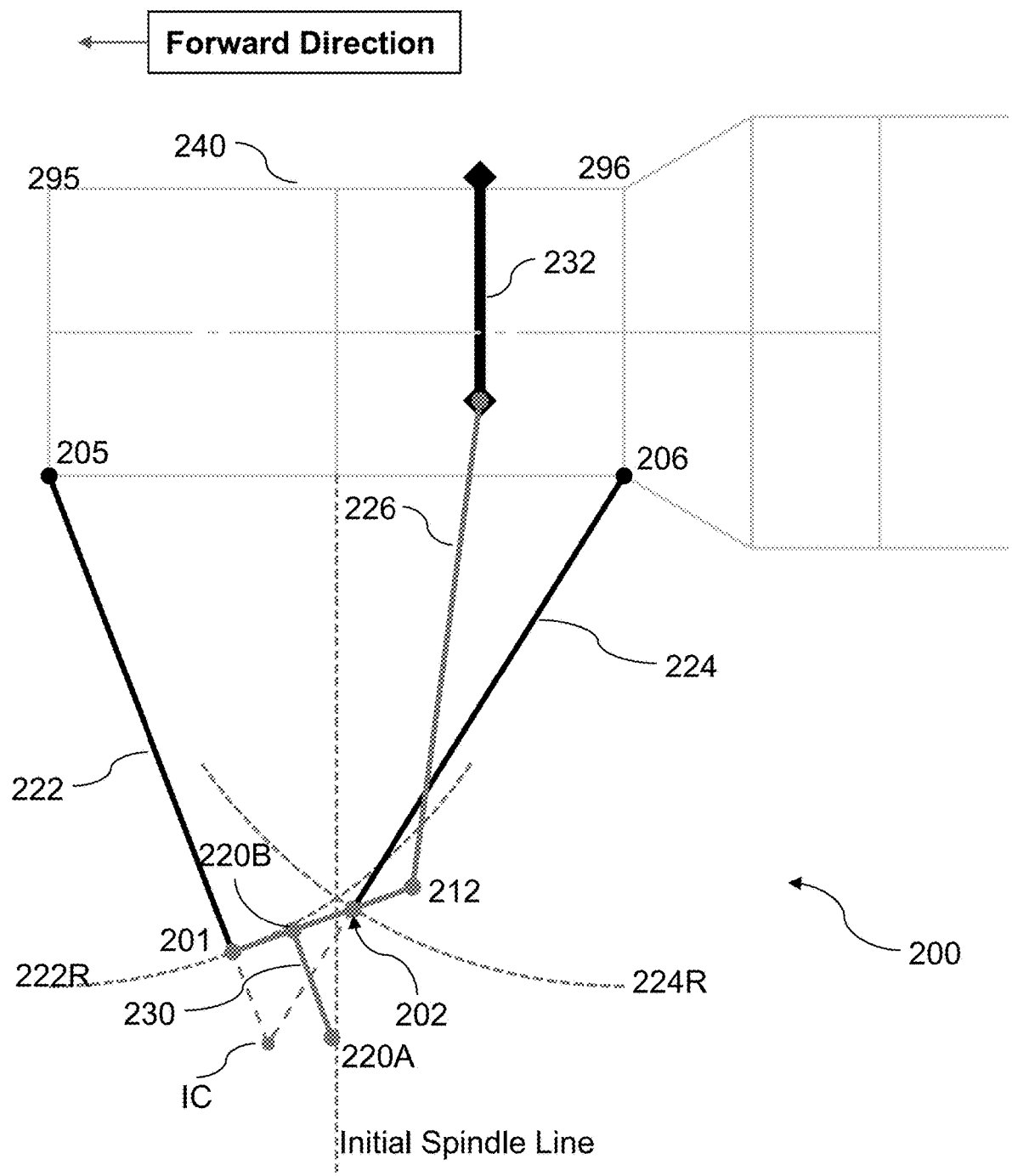
FIG. 3D illustrates a top view of a diagram of the suspension of FIG. 3A turning left 20 degrees.

FIG. 3D illustrates an overhead view of the suspension 200 turning left 20 degrees. As shown, when the wheel turns, the instant center IC where the hypothetical lines extending along each of the first upper link 222 and the second upper link 224 converge moves to the left and away from the initial spindle line. Importantly, the triangle formed by points 201, 202 and 220A still comprises an isosceles triangle or approximately so, with line 201-220A and line 202-220A being approximately equal. Furthermore, as can be seen, the wheel centerline point 220A remains on or within 2.0 cm, and ideally within 6 mm over a +/−30 deg steering range, of the initial spindle line and has traveled along the initial spindle line away from chassis 240 when compared with FIG. 3C.

Figure 3E:
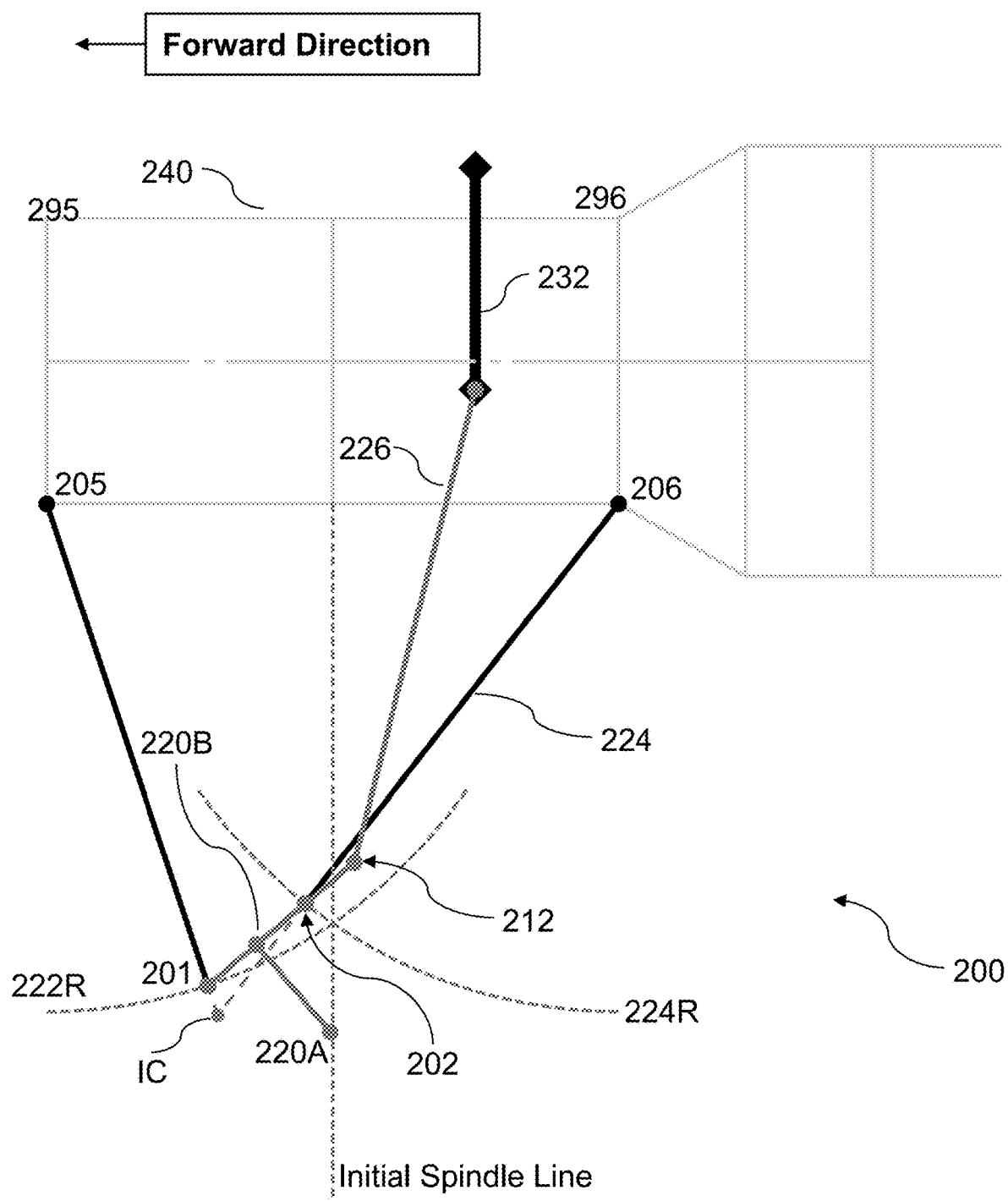
FIG. 3E illustrates a top view of a diagram of the suspension of FIG. 3A turning left 40 degrees.

FIG. 3E illustrates an overhead view of the suspension turning left 40 degrees. As shown, the instant center IC where the hypothetical lines extending along each of the first upper link 222 and the second upper link 224 would converge moves further to the left and away from the initial spindle line. Importantly, the triangle formed by points 201, 202 and 220A still comprises an isosceles triangle or approximately so, with line 201-220A and line 202-220A being approximately equal.

Figure 3F:
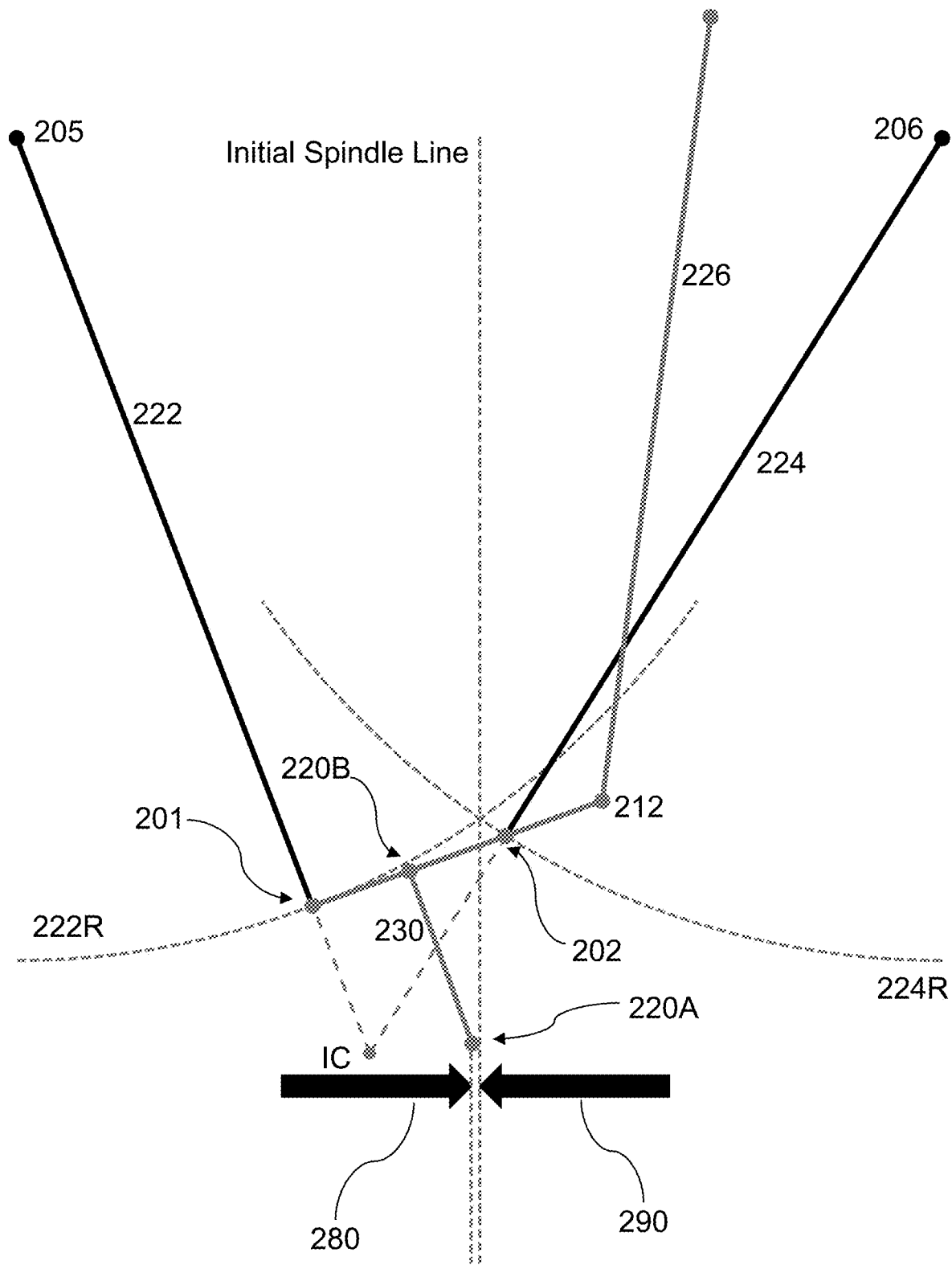
FIG. 3F illustrates an enlarged top view of the suspension shown in FIG. 3E.

FIG. 3F illustrates an enlarged view of a portion of FIG. 3E. As shown, the wheel centerline point 220A is not precisely on the initial spindle line but rather is slightly off the line by a distance measured between arrows 280, 290. However, it is critical that the wheel centerline point 220A remains on or within 2.0 cm, and ideally within 6.0 mm over a +/−30 deg steering range, of the initial spindle line for this embodiment and has traveled along the initial spindle line toward chassis 240 when compared with FIG. 3A. For larger or smaller sized vehicles, it is critical that the wheel centerline point 220A remains on or within 7.0%, and more preferably within 5.0%, of a distance between the inboard pickup points (here, 205, 206), and within 3.5%, and more preferably within 2.5%, of the initial spindle line. Thus, where the inboard pickup points are spaced apart by 200 cm, the wheel centerline point 220A must remain on or within 14.0 cm (7.0% of 200 cm), and preferably within 7.0 cm (3.5% of 200 cm), of the initial spindle line. In a similar fashion, when the inboard pickup points are 30 cm spaced apart and the steered wheel should remain within 7% of that distance to the initial spindle line, that would be a 2.0 cm distance.

Figure 3G:
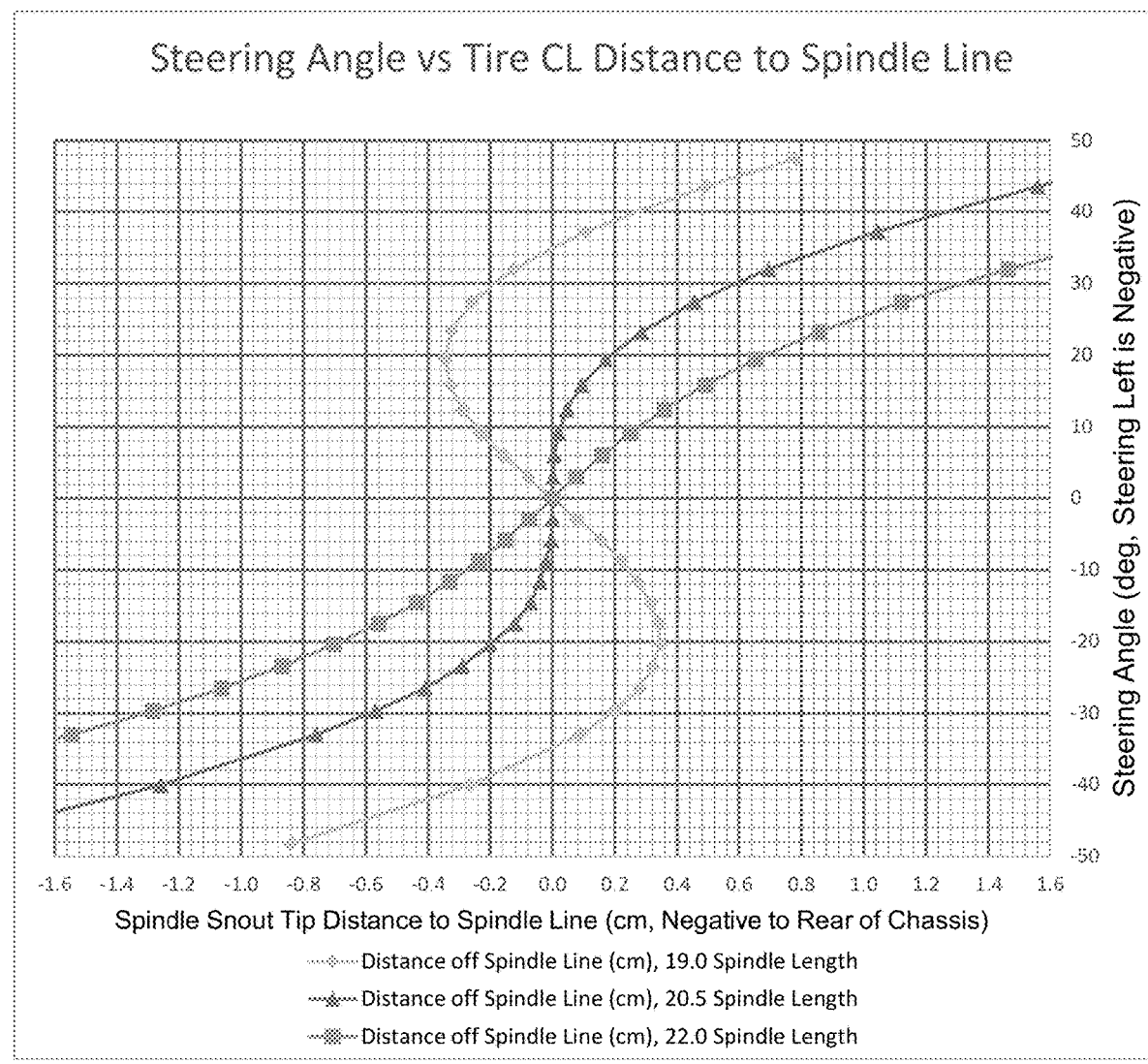
FIG. 3G illustrates a chart that shows a tire center line distance to an initial spindle line as the steering angle changes for the suspension shown in FIGS. 3A-3F.

FIG. 3G comprises a chart that plots the tire center line distance to the initial spindle line as the steering angle changes in the suspension 200 shown in FIGS. 3A-3E. Three different lines are plotted for the slight divergence of the wheel centerline from initial spindle line based on optimization of the spindle "snout" length, or the line 220B to 220A. When the steering angle is at or near zero degrees, the tire centerline distance to the initial spindle line is approximately 0 cm as an initial design constraint. However, even as the steering angle moves away from zero degrees to ±30 degrees, the tire centerline distance to the initial spindle line is less than 1.4 cm for the link lengths discussed in the exemplary embodiment.

Figure 4A:
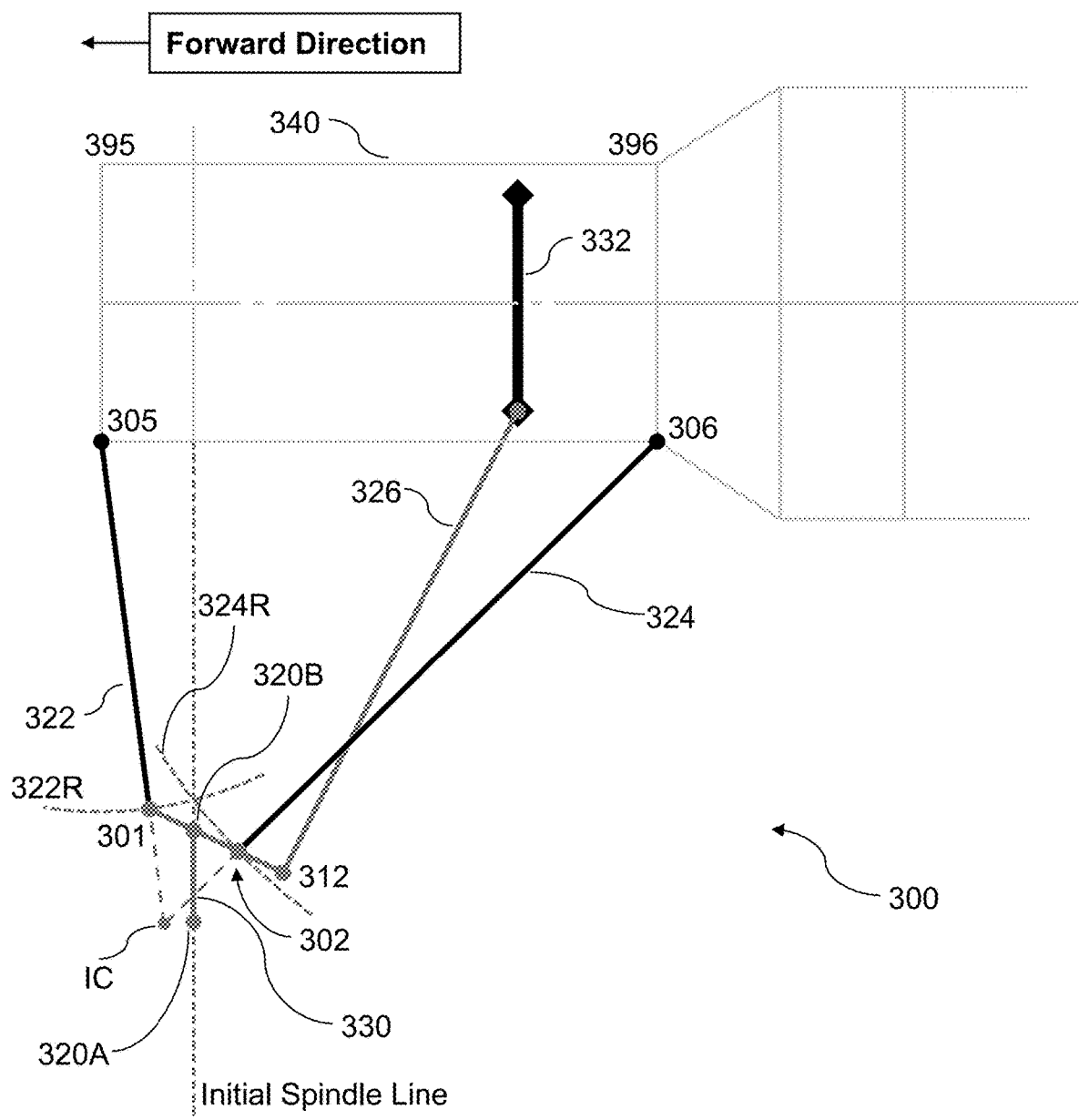
FIG. 4A illustrates a top view of a diagram of another embodiment of an upper part of a front suspension having unequal length front and rear links.

FIGS. 4A-4E illustrate another embodiment of an upper part of a front suspension 300 where the links 322 and 324 are unequal in length. Specifically, as shown in FIG. 4A, the front, upper link 322 is shorter in length than the back, upper link 324.

FIG. 4A illustrates an overhead view of the suspension 300 turning zero degrees (i.e., wheel straight ahead). A first upper link 322 is defined by the line extending between points 301 and 305, with point 301 being where the first upper link 322 couples with the knuckle 330 and point 305 being where the first upper link 322 couples with the chassis 340. A second upper link 324 is defined by the line extending between points 302 and 306, with point 302 being where the second upper link 324 couples with the knuckle 330 and point 306 being where the second upper link couples with the chassis 340. A tie rod 326 connects the knuckle 330 at point 312 to the steering rack 332 to allow steering of the wheel of the vehicle. Dashed line 322R shows the path swept by link 322 during steering, and dashed line 324R shows the path swept by link 324 during steering. The hub/knuckle/upright is defined by the points 301, 302, 312, 320A and 320B, and in a given depiction those points are meant to act as if on a rigid body, with no change in their relationship even as the group of points changes orientation with respect to the chassis. The spindle is meant to be defined as a projection off the hub/knuckle/upright which represents the rotational axis of the wheel and is defined by points 320A to 320B.

The instant center IC is the hypothetical point where hypothetical lines extending along each of the first upper link 322 and the second upper link 324 converge. Here, the suspension in this embodiment incorporates slight feedback to the steering system from external forces by placing point 320A and the spindle line slightly behind the IC in the initial straight ahead configuration.

It is critical that the triangle formed by points 301, 302 and 320A comprises an isosceles triangle or approximately so, with line 301-320A and line 302-320A being approximately equal in length. This specific relationship of an isosceles triangle defined by the points where the links 322, 324 mount to the knuckle 330 and the wheel centerline point 320A at the end of the spindle arm allows for a mechanical bind to be created that eliminates feedback to the steering wheel as the wheel travels or encounters obstacles. However, the group of illustrations in FIGS. 4A-4E demonstrate how the suspension system 300 can be adjusted to incorporate some external loads into the steering for driver feedback, if desired, by having points 320A and 320B behind the IC, or have the points 301, 302 and 320A not form an isosceles triangle. While line 301 to 320A and line 302 to 320A are not of equal length, the triangle of 301 to 302 to IC is still used to inform the location of the hub and spindle points. In addition, it is noted in all embodiments disclosed herein, points 320A and 320B form a line that is perpendicular to the chassis centerline, in the initial steering straight ahead configuration. When the location of point 320B is chosen to incorporate some external loads into the steering system, the length of the line 320A to 320B can still be adjusted (as documented in graph of FIG. 4F) to minimize or increase the leverage of external forces on the steering system.

As discussed above, the variation of the lengths of the lines forming the isosceles or near-isosceles triangle will depend on the length of line 305-306, the distance between the suspension inboard attachment points 305, 306 where the two upper links 322, 324 couple to the chassis 340. The opposite side of the chassis 340 has inboard attachment points 395, 396. As a distance between the points 305, 306 becomes greater, less variance will be tolerated. For a given embodiment describe by the collection of FIGS. 4A-4E, the Chassis Width is 45 cm, the Chassis Inboard Pickup Points Width is 90 cm, the Half of Track Width is 100.44 cm, the Tire Centerline (CL) to Edge of Chassis is 77.94 cm, the Spindle Line From Front is 15 cm, the Upper Link Front is 60 cm, the Upper Link Rear is 94.87 cm, the Upright Top Length is 16 cm, the Spindle Snout Length is 15.0 cm, and also depicted at 14.0 cm and 16.0 cm, Steering Rack to Spindle Line is 52.5 cm, Steering Rack Width is 35 cm, Tie Rod Length is 83.94 cm. For the example as detailed numerically above, it is important to remember that the relationship between the points is what gives the desired functionality of the arcuate telescoping geometry resulting in a non-back-drivable steering system. For the one embodiment detailed above, when the relationship is defined in a ratio to the width between the inboard suspension pick up points (305 and 306), the percentages would be: Chassis Width is 0.50 (50%), Chassis Inboard Pickup Points Width is 1.00 (100%), Half of Track Width is 1.12 (112%), Tire CL to Edge of Chassis is 0.87 (87%), Spindle Line, From Front is 0.17 (17%), Upper Link Front is 0.67 (67%), Upper Link Rear is 1.05 (105%), Upright Top Length is 0.18 (18%), Spindle Snout Length options are 0.16 (16%), 0.17 (17%), and 0.18 (18%), Steering Rack to Spindle Line is 0.58 (58%), Steering Rack Width is 0.39 (39%), Tie Rod Length is 0.93 (93%).

In addition, as the tire rotates (steered left or right) causing movement of links 322, 324, the wheel centerline point 320A will travel back and forth along the initial spindle line (toward and away from the chassis 340) and will remain on or within 2.0 cm, and ideally within 6 mm over a +/−30 deg steering range, of the initial spindle line.

Figure 4B:
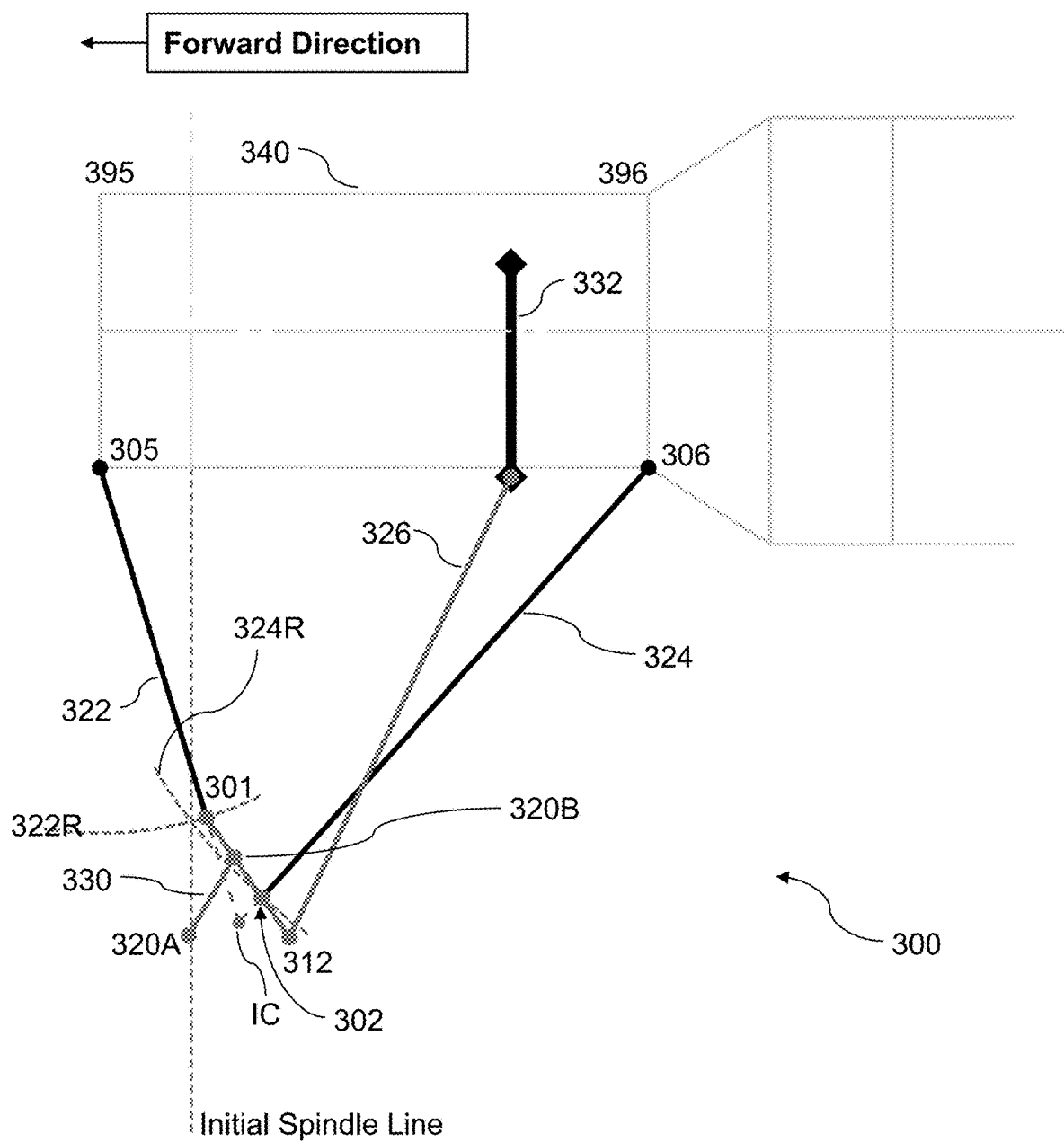
FIG. 4B illustrates a top view of a diagram of the suspension of FIG. 4A turning right 30 degrees.
Figure 4C:
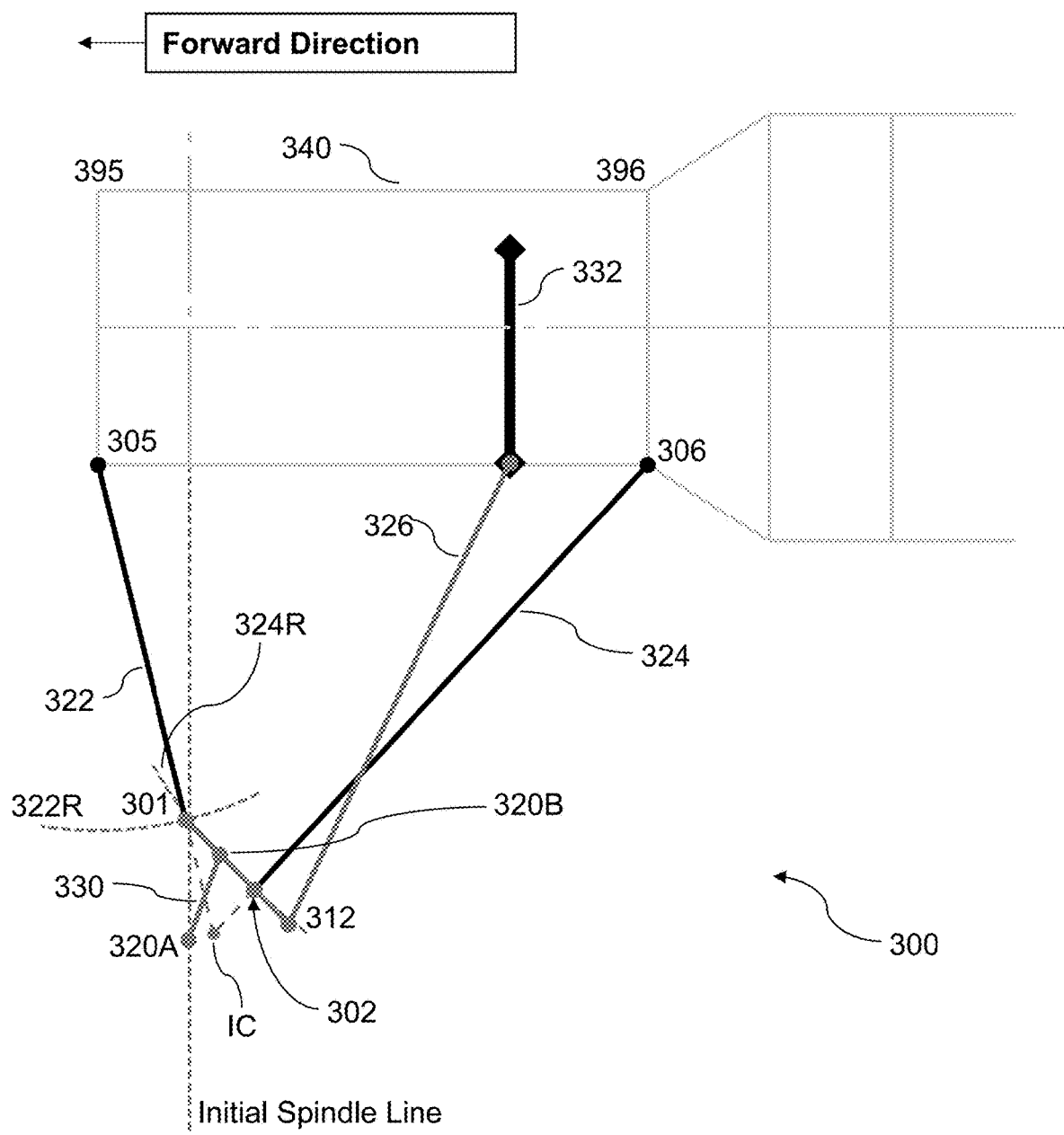
FIG. 4C illustrates a top view of a diagram of the suspension of FIG. 4A turning right 20 degrees.

FIG. 4B illustrates an overhead view of the suspension 300 turning right 30 degrees, and FIG. 4C illustrates an overhead view of the suspension 300 turning right 20 degrees. As shown, when the wheel turns to the right, the instant center IC where the hypothetical lines extending along each of the first upper link 322 and the second upper link 324 would converge moves to the right of the initial spindle line. Importantly, the triangle formed by points 301, 302 and 320A still comprises an isosceles triangle or approximately so, with line 301-320A and line 302-320A being approximately equal. Furthermore, as can be seen, the wheel centerline point 320A remains on or within 2.0 cm, and ideally within 6 mm over a +/−30 deg steering range, of the initial spindle line and has traveled along the initial spindle line toward chassis 340 when compared with FIG. 4A.

Figure 4D:
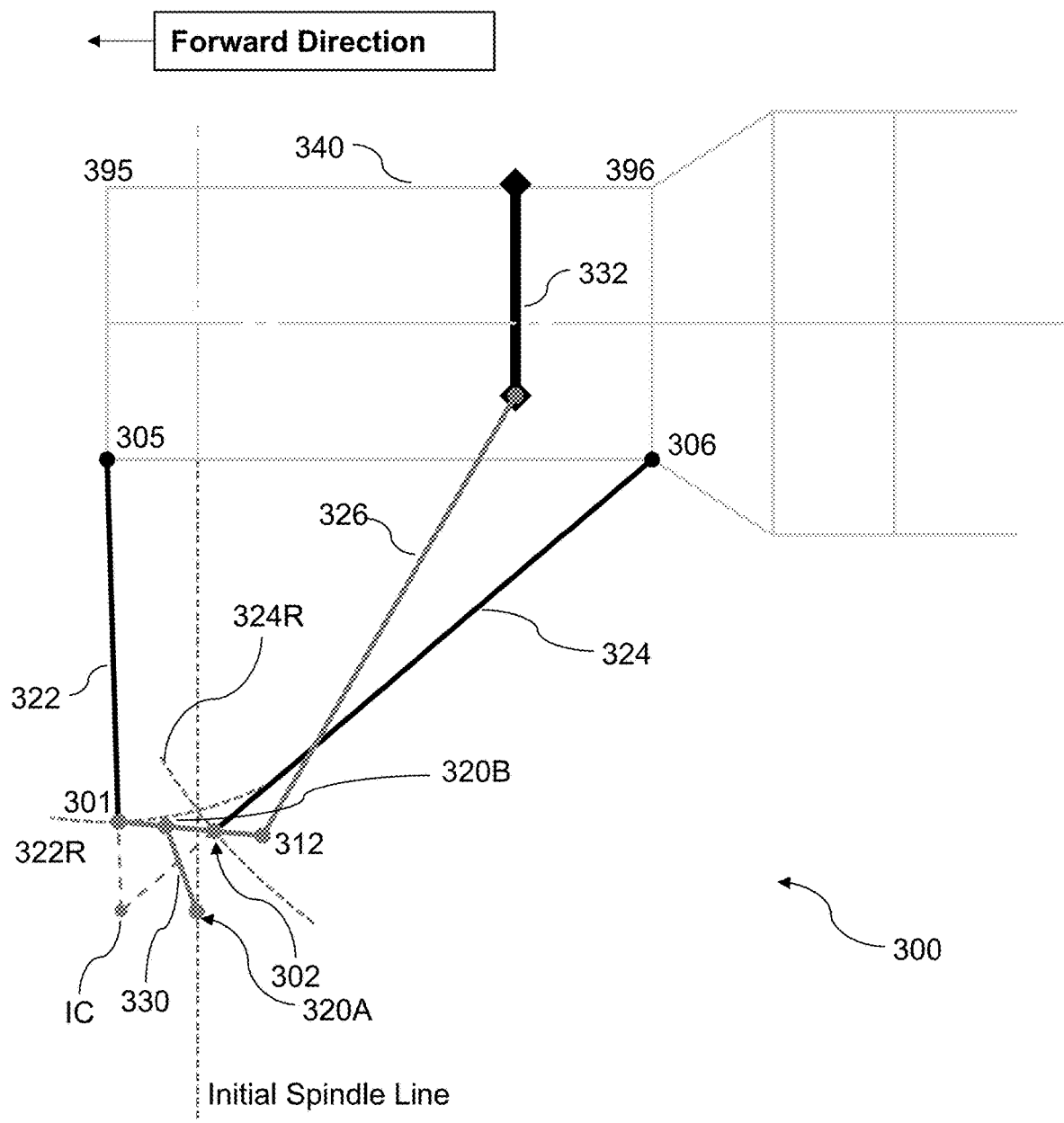
FIG. 4D illustrates a top view of a diagram of the suspension of FIG. 4A turning left 20 degrees.
Figure 4E:
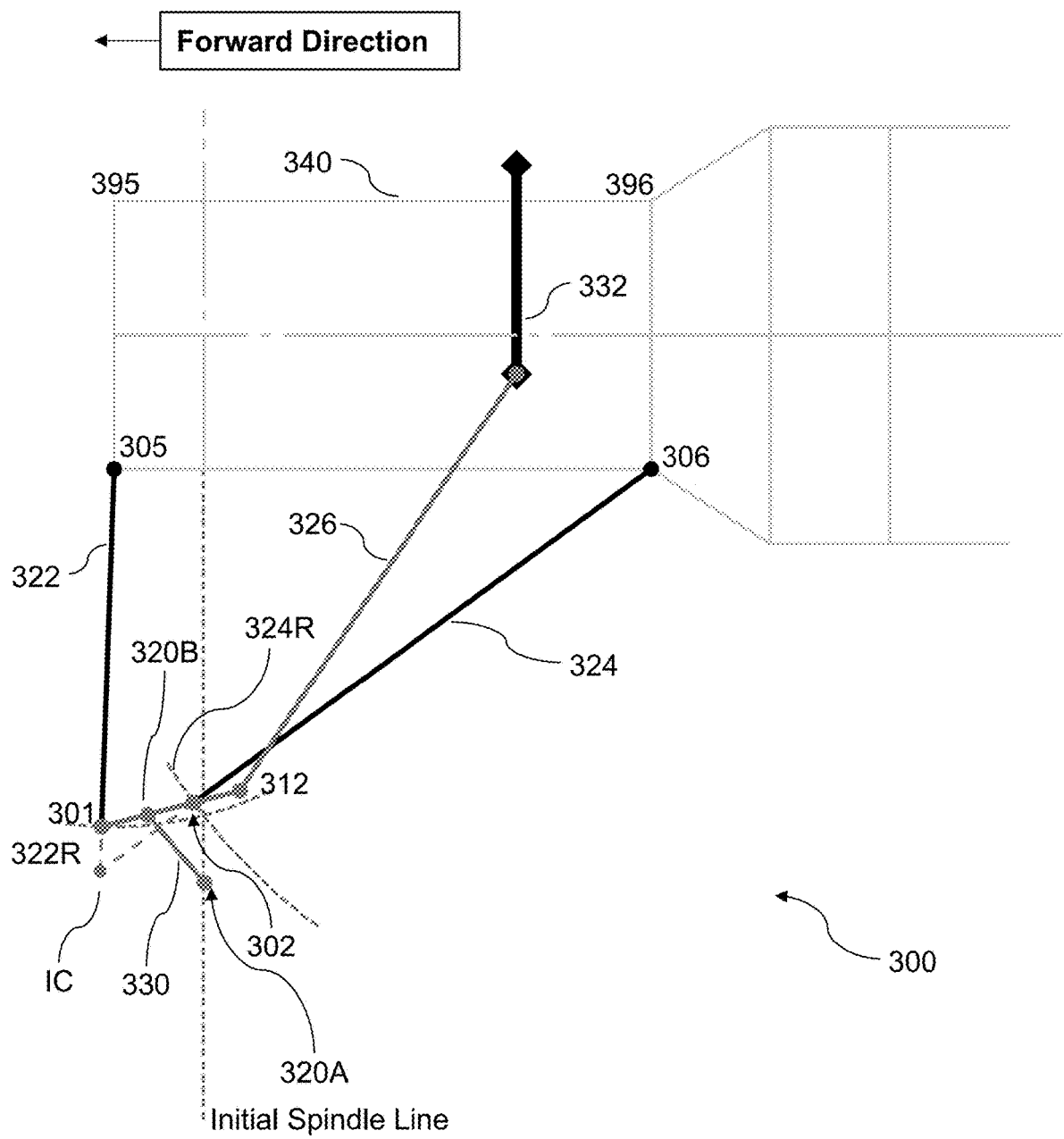
FIG. 4E illustrates a top view of a diagram of the suspension of FIG. 4A turning left 40 degrees.

FIG. 4D illustrates an overhead view of the suspension 300 turning left 20 degrees, and FIG. 4E illustrates an overhead view of the suspension 300 turning left 40 degrees. As shown, when the wheel turns to the left, the instant center IC where the hypothetical lines extending along each of the first upper link 322 and the second upper link 324 converge moves to the left. Importantly, the triangle formed by points 301, 302 and 320A still comprises an isosceles triangle or approximately so, with line 301-320A and line 302-320A being approximately equal. Furthermore, as can be seen, the wheel centerline point 320A remains on or within 2.0 cm, and ideally within 6 mm over a +/−30 deg steering range, of the initial spindle line and has traveled along the initial spindle line away from chassis 340 when compared with FIG. 4A.

Figure 4F:
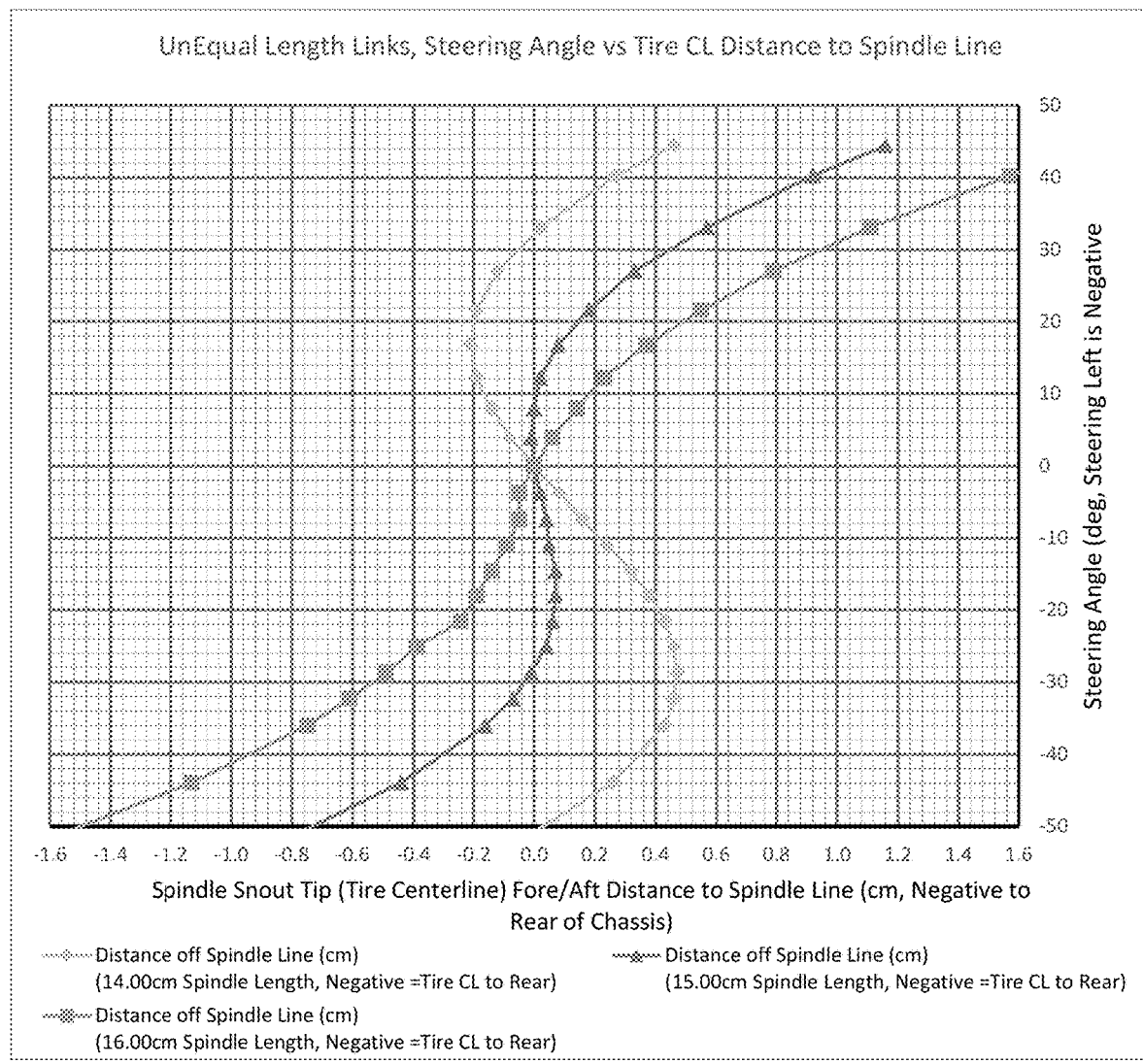
FIG. 4F illustrates a chart that shows a tire center line distance to an initial spindle line as the steering angle changes for the suspension shown in FIGS. 4A-4F.

FIG. 4F comprises a chart that plots the tire center line distance to the initial spindle line as the steering angle changes in the suspension 300 shown in FIGS. 4A-4E. As can be seen in the chart, the tire centerline distance to the initial spindle line is less than 6.0 mm, meaning the tire centerline remains within 2.0 cm, and ideally within 6.0 mm over a +/−30 deg steering range, of the initial spindle line even as the wheel is turned. The chart depicts three different lengths of spindle snout (320B to 320A) as one of ordinary skill in the art could choose which method of slight deviation of a geometric ideal desirable to implement. For larger or smaller sized vehicles, it is critical that the wheel centerline point 320A remains on or within 7.0%, and preferably within 5.0%, of a distance between the inboard pickup points (here, 305, 306), and within 3.5%, and preferably within 2.5%, of the initial spindle line. Thus, where the inboard pickup points are spaced apart by 200 cm, the wheel centerline point 320A must remain on or within 14.0 cm (5.0% of 200 cm), and preferably within 7.0 cm (2.5% of 200 cm), of the initial spindle line.

Figure 5A:
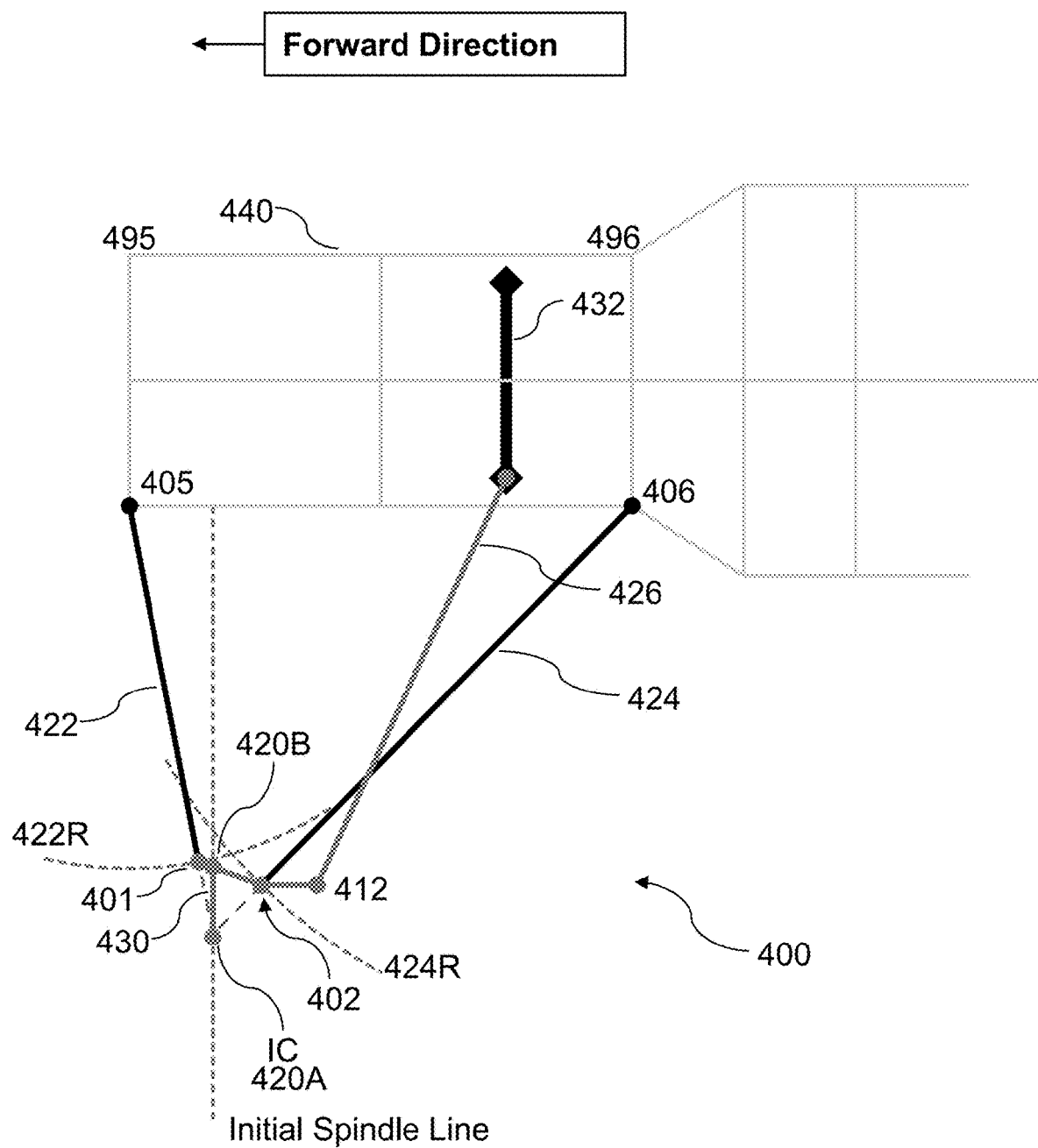
FIG. 5A illustrates a top view of a diagram of another embodiment of an upper part of a front suspension having unequal length front and rear links.

FIGS. 5A-5E illustrate another embodiment of an upper part of a front suspension 400 where the links 422 and 424 are unequal in length. Specifically, as shown in FIG. 5A, the front, upper link 422 is shorter in length than the back, upper link 424. For a given embodiment describe by FIGS. 5A-5E, the Chassis Width is 45 cm, the Chassis Inboard Pickup Points Width is 90 cm, the Half of Track Width is 99.74 cm, the Tire CL to Edge of Chassis is 77.24 cm, the Spindle Line From Front is 15 cm, the Link Front is 65 cm, the Link Rear is 95 cm, the Upright Top Length is 11.88 cm, the Upright Front Top Length (Front Link to Spindle Arm+Axis) is 2.7 cm, the Spindle Arm Length options depicted are 12.00 cm, 12.50 cm, and 13.00 cm, the Spindle Arm Angle to Upright is 69.56 deg, the Steering Rack to Spindle Line is 52.5 cm, the Steering Rack Width is 35 cm, the Tie Rod Length is 80.43 cm.

For the example as detailed numerically above, it is important to remember that the relationship between the points is what gives the desired functionality of the arcuate telescoping geometry resulting in a non-back-drivable steering system. It is critical that the triangle formed by points 401, 402 and 420A comprises an isosceles triangle or approximately so, with line 401-420A and line 402-420A being approximately equal. For the one embodiment detailed above, when the relationship is defined in a ratio to the width between the inboard suspension pick up points (205 and 206), the percentages would be: Chassis Width is 0.50 (50%), Chassis Inboard Pickup Points Width is 1.00 (100% by definition), Half of Track Width is 1.11 (111%), Tire CL to Edge of Chassis is 0.86 (86%), Spindle Line, From Front is 0.17 (17%), Link Front is 0.72 (72%), Link Rear is 1.06 (106%), Upright Top Length is 0.13 (13%), Upright Front Top Length (Front Link to Spindle Arm+Axis) is 0.03 (3%), Spindle Arm Length options depicted are 0.13 (13%), 0.139 (13.9%), and 0.144 (14.4%), Steering Rack to Spindle Line is 0.58 (58%), Steering Rack Width is 0.39 (39%), and Tie Rod Length is 0.89 (89%). The opposite side of the chassis 440 has inboard attachment points 495, 496.

FIG. 5A illustrates an overhead view of the suspension 400 turning zero degrees (i.e., wheel straight ahead). A first upper link 422 is defined by the line extending between points 401 and 405, with point 401 being where the first upper link 422 couples with the knuckle 430 and point 405 being where the first upper link 422 couples with the chassis 440. A second upper link 424 is defined by the line extending between points 402 and 406, with point 402 being where the second upper link 424 couples with the knuckle 430 and point 406 being where the second upper link couples with the chassis 440. A tie rod 426 connects the knuckle 430 at point 412 to the steering rack 432 to allow steering of the wheel of the vehicle. Dashed line 422R shows the path swept by link 422, and dashed line 424R shows the path swept by link 424. The hub/knuckle/upright is defined by the points 401, 402, 412, 420A and 420B, and in a given embodiment those points are meant to act as if on a rigid body, with no change in their relationship even as the group of points changes orientation with respect to the chassis. The spindle is meant to be defined as a projection off the hub/knuckle/upright which represents the rotational axis of the wheel and is defined by points 420A to 420B. The opposite side of the chassis 440 has inboard attachment points 495, 496.

The instant center IC is the hypothetical point where hypothetical lines extending along each of the first upper link 422 and the second upper link 424 converge. As seen in FIG. 5A, the instant center IC converges on the initial spindle line when the wheel is straight ahead. With this arrangement of links and the tip of the spindle, or spindle snout, defined by an Isosceles triangle, the IC point is defined to be point 420A. The spindle snout tip, or point 420A, is geometrically the wheel centerline in this two-dimensional embodiment of a suspension viewed from above.

It is critical that the triangle formed by points 401, 402 and 420A comprises an isosceles triangle or approximately so, with line 401-420A and line 402-420A being approximately equal. This specific relationship of an isosceles triangle defined by the points where the links 422, 424 mount to the knuckle 430 and the wheel centerline point 420A at the end of the spindle arm allows for a mechanical bind to be created that eliminates feedback to the steering wheel as the wheel travels or encounters obstacles.

As discussed above, the variation of the lengths of the lines forming the isosceles or near-isosceles triangle will depend on the length of line 405-406, the distance between the points 405, 406 where the two upper links 422, 424 couple to the chassis 440. As the distance between the points 405, 406 becomes greater, less variance will be tolerated.

In addition, as the tire rotates (steered left or right) causing movement of links 422, 424, the wheel centerline point 420A will travel back and forth along the initial spindle line (toward and away from the chassis 440) and will remain on or within 2.0 cm, and ideally within 6 mm over a +/−30 deg steering range, of the initial spindle line. As used herein, the "initial spindle line" is defined as the spindle line of the knuckle 430 when the wheel is straight ahead.

Figure 5B:
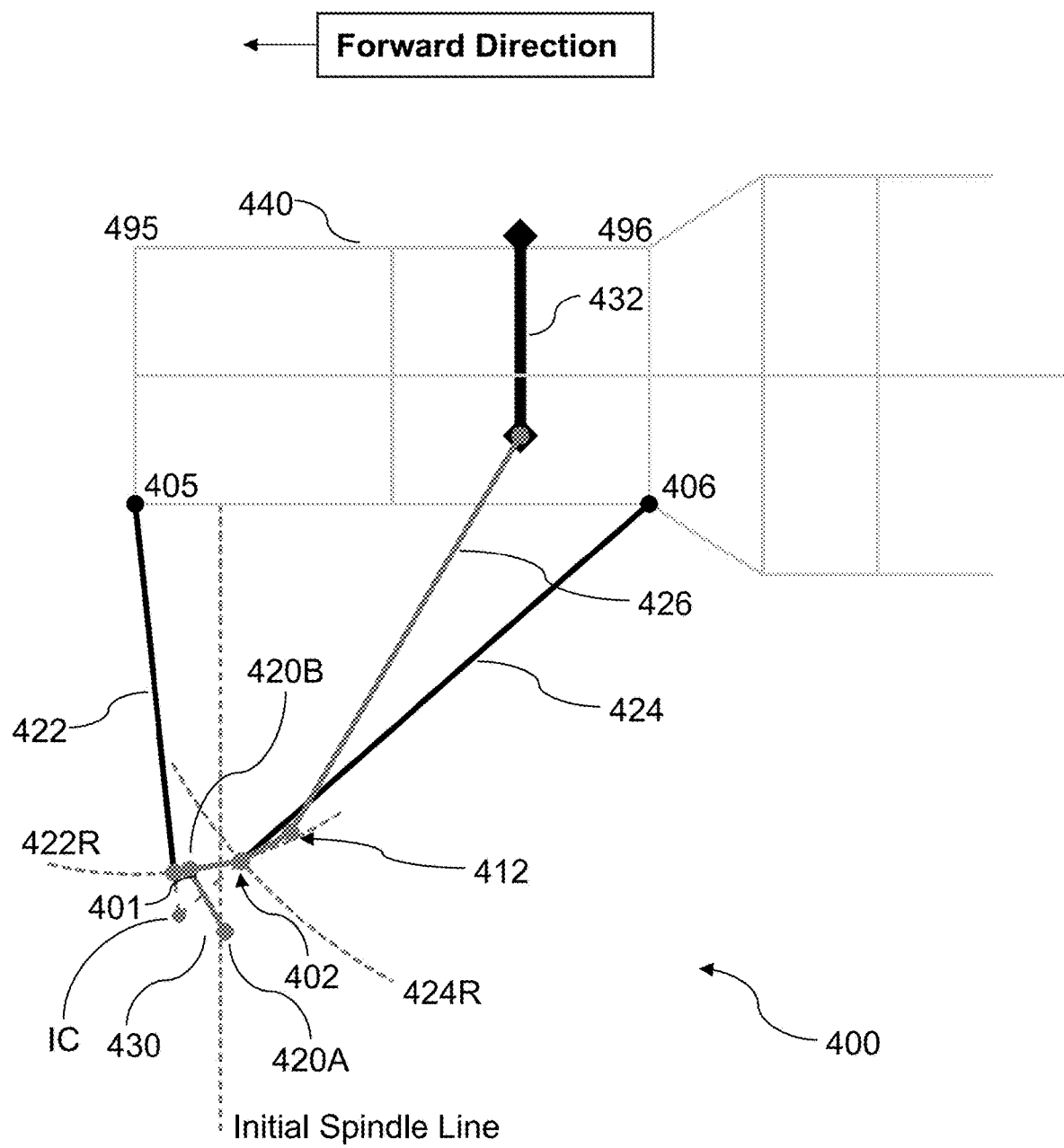
FIG. 5B illustrates a top view of a diagram of the suspension of FIG. 5A turning left 30 degrees.
Figure 5C:
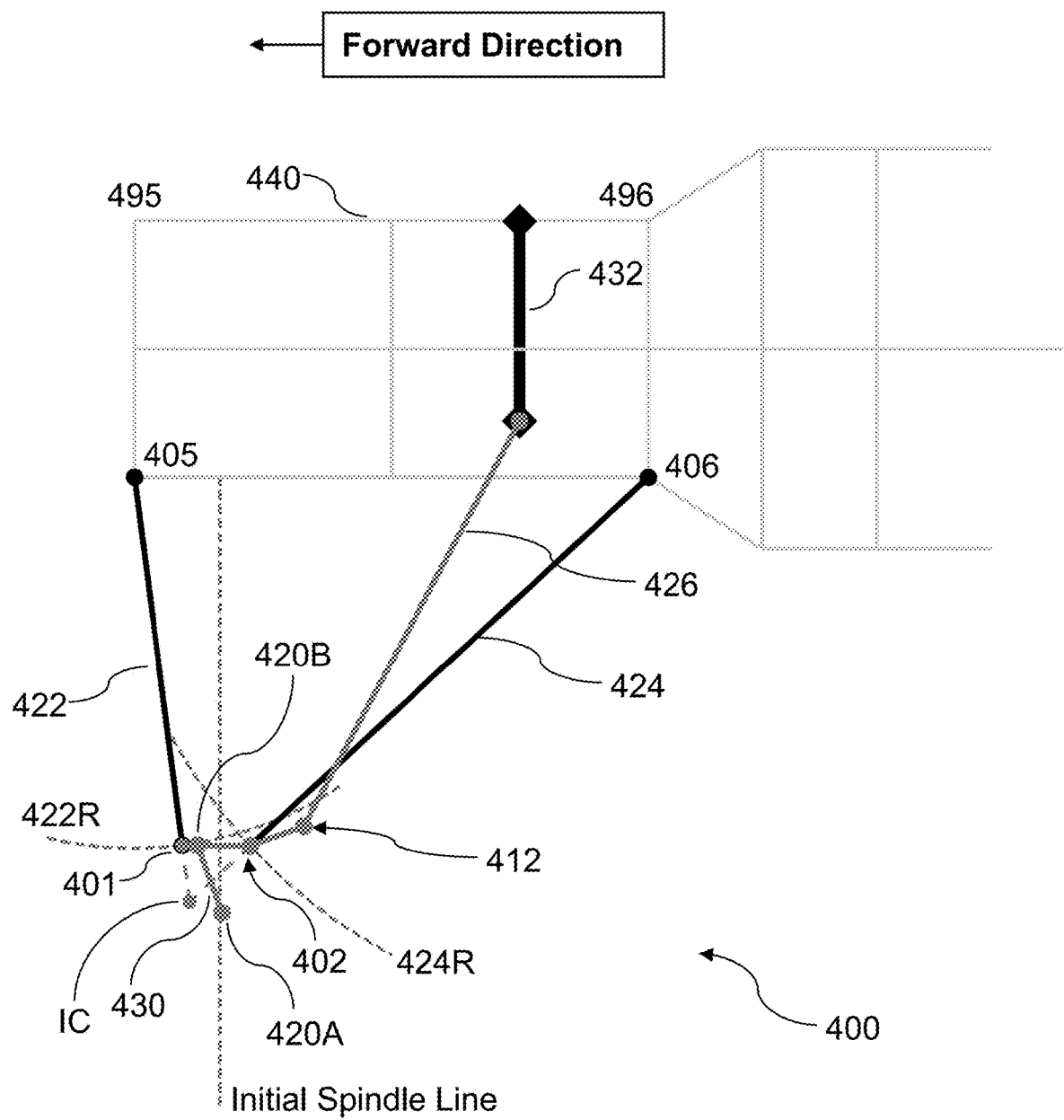
FIG. 5C illustrates a top view of a diagram of the suspension of FIG. 5A turning left 20 degrees.

FIG. 5B illustrates an overhead view of the suspension 400 turning left 30 degrees, and FIG. 5C illustrates an overhead view of the suspension 400 turning left 20 degrees. As shown, when the wheel turns to the left, the instant center IC where the hypothetical lines extending along each of the first upper link 422 and the second upper link 424 would converge moves to the left. Importantly, the triangle formed by points 401, 402, and 420A still comprises an isosceles triangle or approximately so, with line 401-420A and line 402-420A being approximately equal. Furthermore, as can be seen in FIG. 5F, the wheel centerline point 420A remains on or within 2.0 cm, and ideally within 6 mm over a +/−30 deg steering range, of the initial spindle line and has traveled along the initial spindle line away from chassis 440 when compared with FIG. 5A.

Figure 5D:
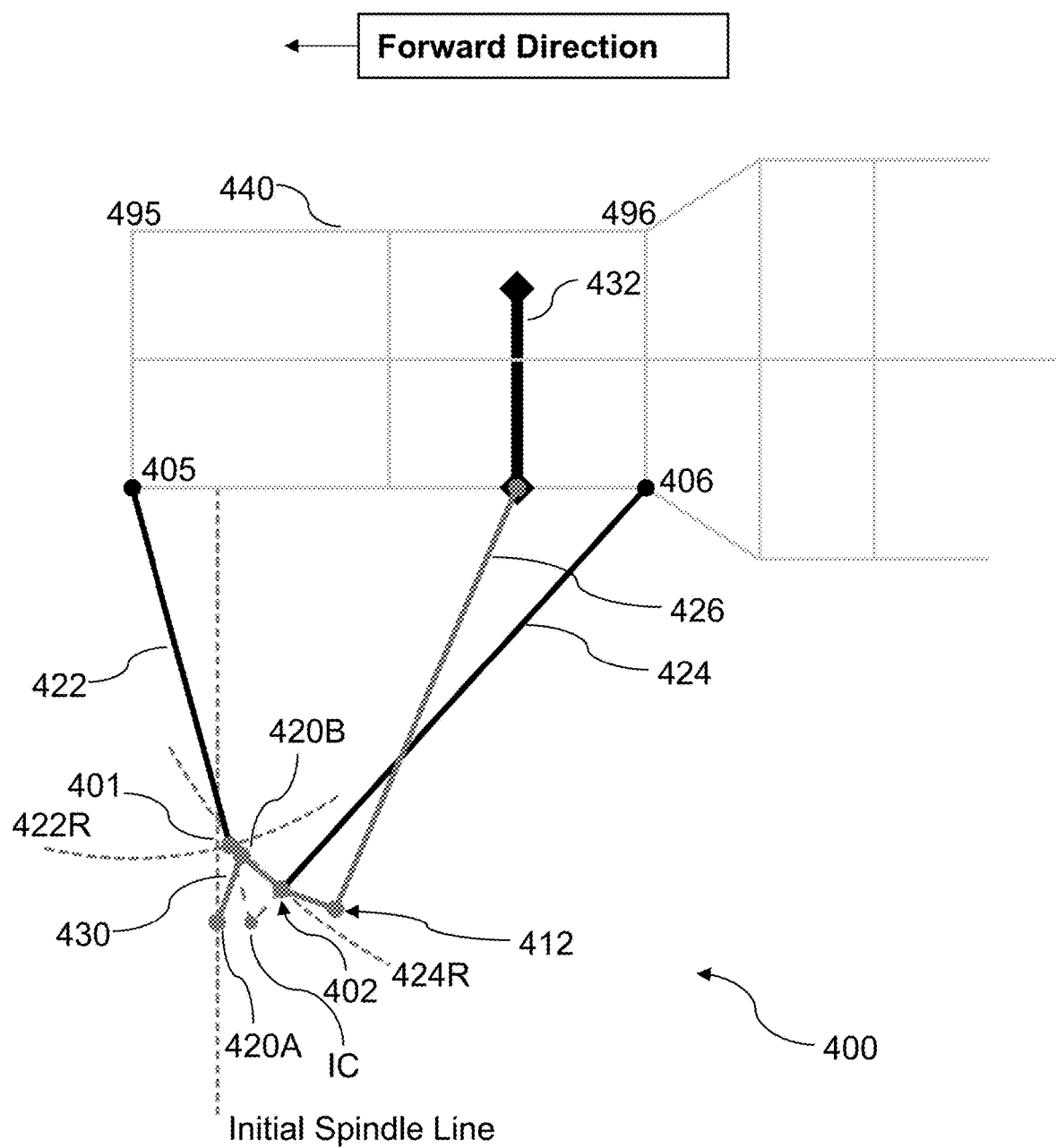
FIG. 5D illustrates a top view of a diagram of the suspension of FIG. 5A turning right 20 degrees.
Figure 5E:
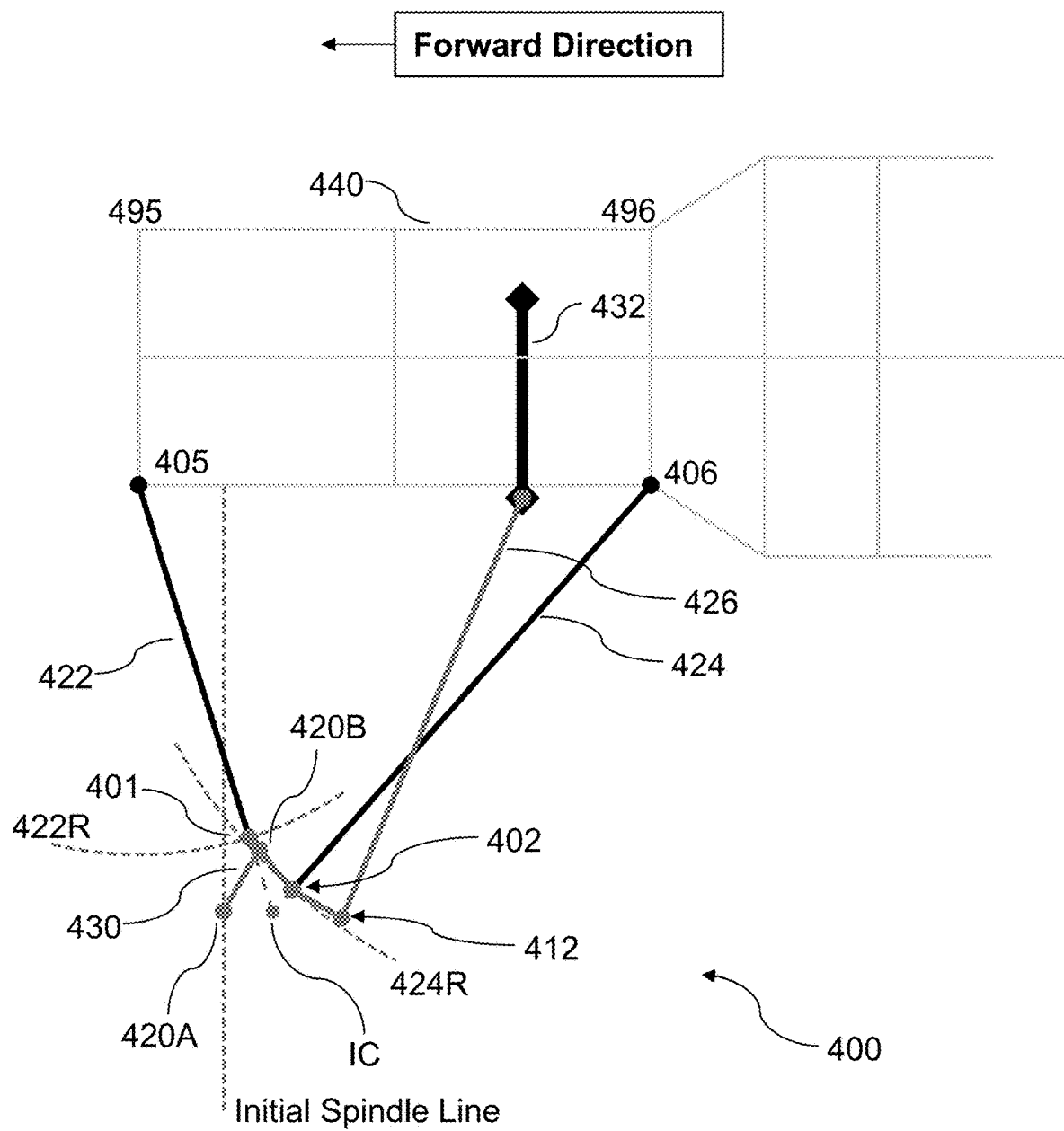
FIG. 5E illustrates a top view of a diagram of the suspension of FIG. 5A turning right 30 degrees.

FIG. 5D illustrates an overhead view of the suspension 400 turning right 20 degrees, and FIG. 5E illustrates an overhead view of the suspension 400 turning right 30 degrees. As can be seen, as the wheel turns to the right, the instant center IC where the hypothetical lines extending along each of the first upper link 422 and the second upper link 424 would converge moves rearward of the spindle line. Importantly, the triangle formed by points 401, 402, and 420A still comprises an isosceles triangle or approximately so, with line 401-420A and line 402-420A being approximately equal. Furthermore, as can be seen, the wheel centerline point 420A remains on or within 2.0 cm, and ideally within 6 mm over a +/−30 deg steering range, of the initial spindle line and has traveled along the initial spindle line toward chassis 440 when compared with FIG. 5A.

Figure 5F:
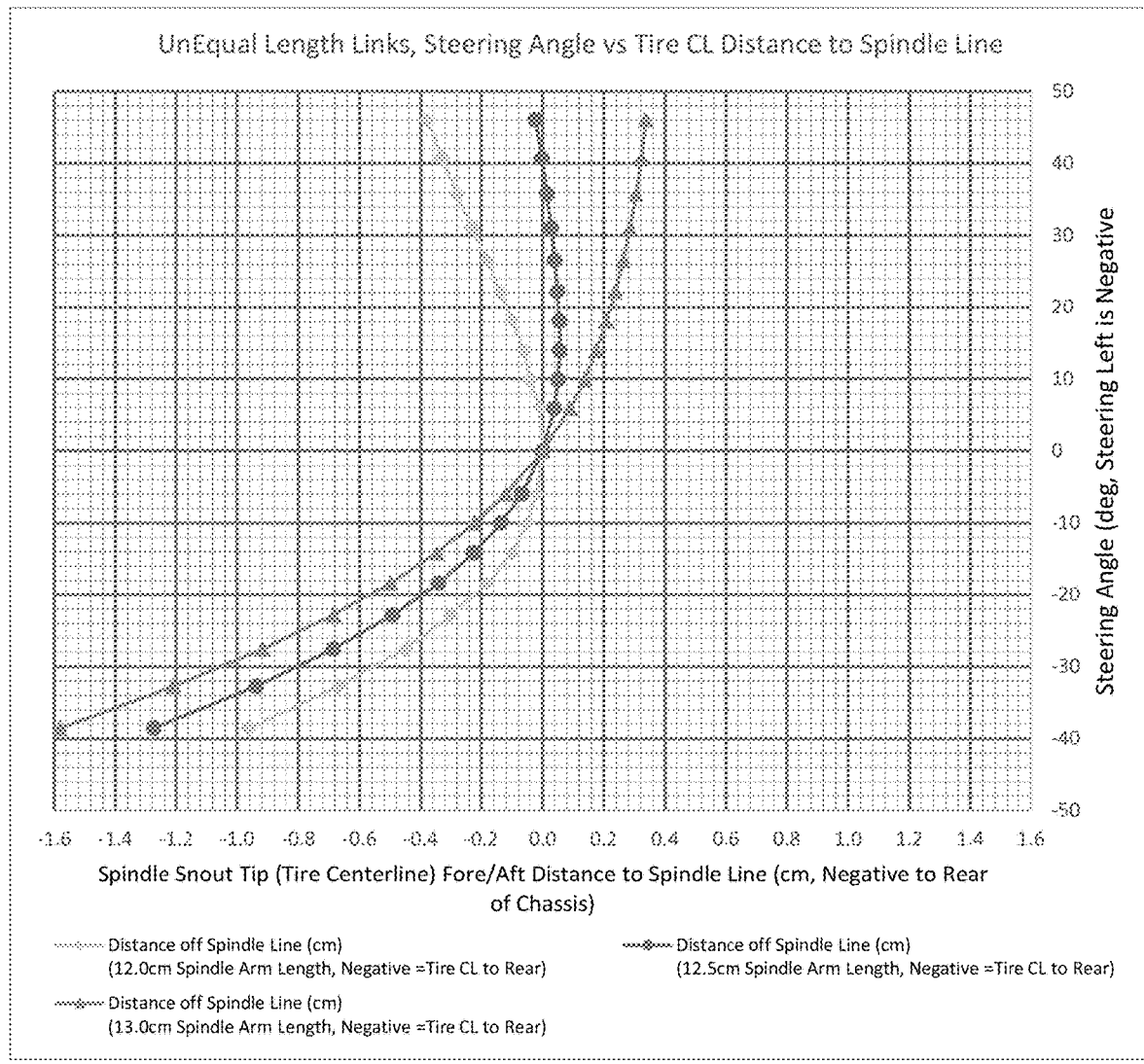
FIG. 5F illustrates a chart that shows a tire center line distance to an initial spindle line as the steering angle changes for the suspension shown in FIGS. 5A-5E.

FIG. 5F comprises a chart that plots the tire center line distance to the initial spindle line as the steering angle changes in the suspension 400 shown in FIGS. 5A-5E. When the steering angle is at or near zero degrees, the tire centerline distance to the initial spindle line is approximately 0 mm. The three lines in the chart depict three different lengths of the spindle "snout" as part of the optimization of designing the arcuate telescoping system. However, even as the steering angle moves away from zero degrees to ±30 degrees, the tire centerline distance to the initial spindle line is less than 6.0 mm.

Figure 6A:
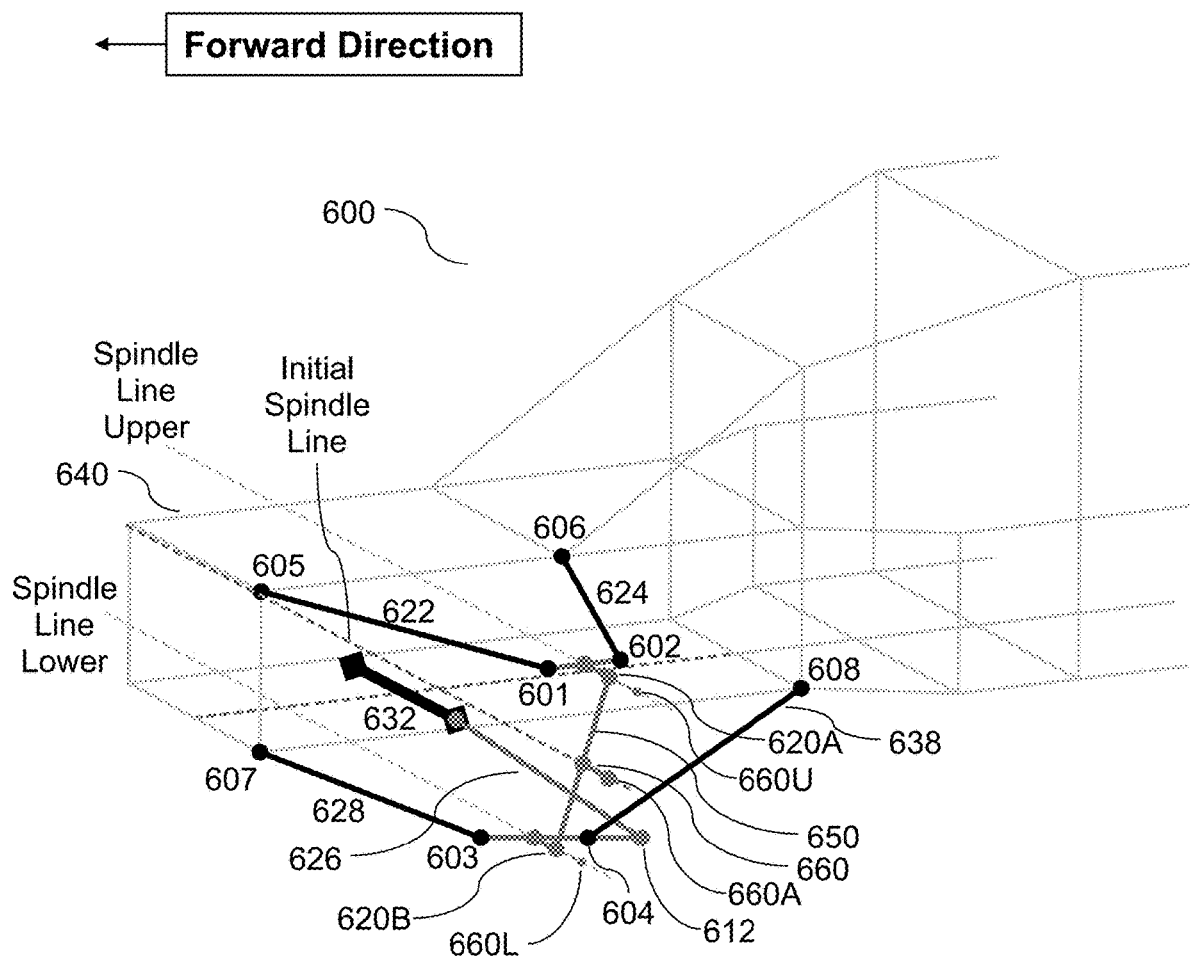
FIG. 6A illustrates an isometric view of a diagram of another embodiment of a front suspension.

In FIGS. 6A-6F, the upper and lower parts of another embodiment of a front suspension 600 is depicted. FIG. 6A illustrates an isometric view of the suspension 600 turning zero degrees (i.e., wheel straight ahead). The suspension 600 comprises a multi-link system. A first upper link 622 is defined by the line extending between points 601 and 605, with point 601 being where the first upper link 622 couples with the upright 650 and point 605 being where the first upper link 622 couples with the chassis 640. A second upper link 624 is defined by the line extending between points 602 and 606, with point 602 being where the second upper link 624 couples with the upright 650 and point 606 being where the second upper link couples with the chassis 640. The suspension inboard attachment or pickup points are defined by points 605, 606.

A first lower link 628 is defined by the line extending between points 603 and 607, with point 603 being where the first lower link 628 couples with the upright 650 and point 607 being where the first lower link 628 couples with the chassis 640. A second lower link 638 is defined by the line extending between points 604 and 608, with point 604 being where the second lower link 638 couples with the upright 650 and point 608 being where the second lower link 638 couples with the chassis 640.

In this embodiment, the first upper link 622 and the second upper link 624 comprise the same length, although different links having different lengths are also contemplated. The first lower link 628 and the second lower link 638 comprise different or unequal lengths but could also comprise equal lengths. A tie rod 626 connects the upright 650 at point 612 to the steering rack 632 to allow steering of the wheel of the vehicle.

A first instant center IC1 (not pictured) is the hypothetical point where hypothetical lines extending along each of the first upper link 622 and the second upper link 624 converge. A second instant center IC2 (not pictured) is the hypothetical point where hypothetical lines extending along each of the first lower link 628 and the second lower link 638 converge.

It is critical that the triangle formed by points 601, 602 and 660U comprises an isosceles triangle or approximately so, with line 601-660U and line 602-660U being approximately equal. In addition, the triangle formed by points 603, 604 and 660L also comprises an isosceles triangle or approximately so, with line 603-660L and line 604-660L being approximately equal. Point 660L is the design terminus of a lower spindle and point 660U is the design terminus of an upper spindle.

These specific relationships of isosceles triangles defined by (i) the points where the links 622, 624 mount to the upright 650 and the wheel centerline point 620A at the end of the spindle arm, and (ii) the points where the links 628, 638 mount to the upright 650 and the wheel centerline point 620B at the end of the spindle arm, allows for a mechanical bind to be created that eliminates feedback to the steering wheel as the wheel travels or encounters obstacles. While both the upper and lower set of suspension links can be arranged to exhibit arcuate telescoping behavior and effectively shorten while steered, the upper link can be designed to shorten more than the lower link, thus giving a three-dimensional suspension that exhibits camber gain when steered so that the tire contact patch on the ground remains in the same place. In other words, the effect created results in no track width change, only camber gain.

The variation of the lengths of the lines forming the isosceles or near-isosceles triangle will depend on the length of line 605-606, the distance between the points 605, 606 where the two upper links 622, 624 couple to the chassis 640, and the length of line 607-608, the distance between the points 607, 608 where the two lower links 628, 638 couple to the chassis 640. As the distance between the points 605, 606, or the points 607, 608 becomes greater, less variance will be tolerated.

In addition, as the tire pivots (steered left or right) causing movement of links 622, 624, the wheel center line point 620A will travel back and forth along the upper initial spindle line (toward and away from the chassis 640) and will remain on or within 2.0 cm, and ideally within 6 mm over a +/−30 deg steering range, of the upper initial spindle line. As used herein, the "initial spindle line" is defined as the upper and lower spindle lines of the knuckle 630 when the wheel is straight ahead. Similarly, as the tire rotates (steered left or right) causing movement of links 628, 638, the wheel centerline point 620B will travel back and forth along the lower initial spindle line (toward and away from the chassis 640) and will remain on or within 2.0 cm, and ideally within 6 mm over a +/−30 deg steering range, of the lower initial spindle line.

Figure 6B:
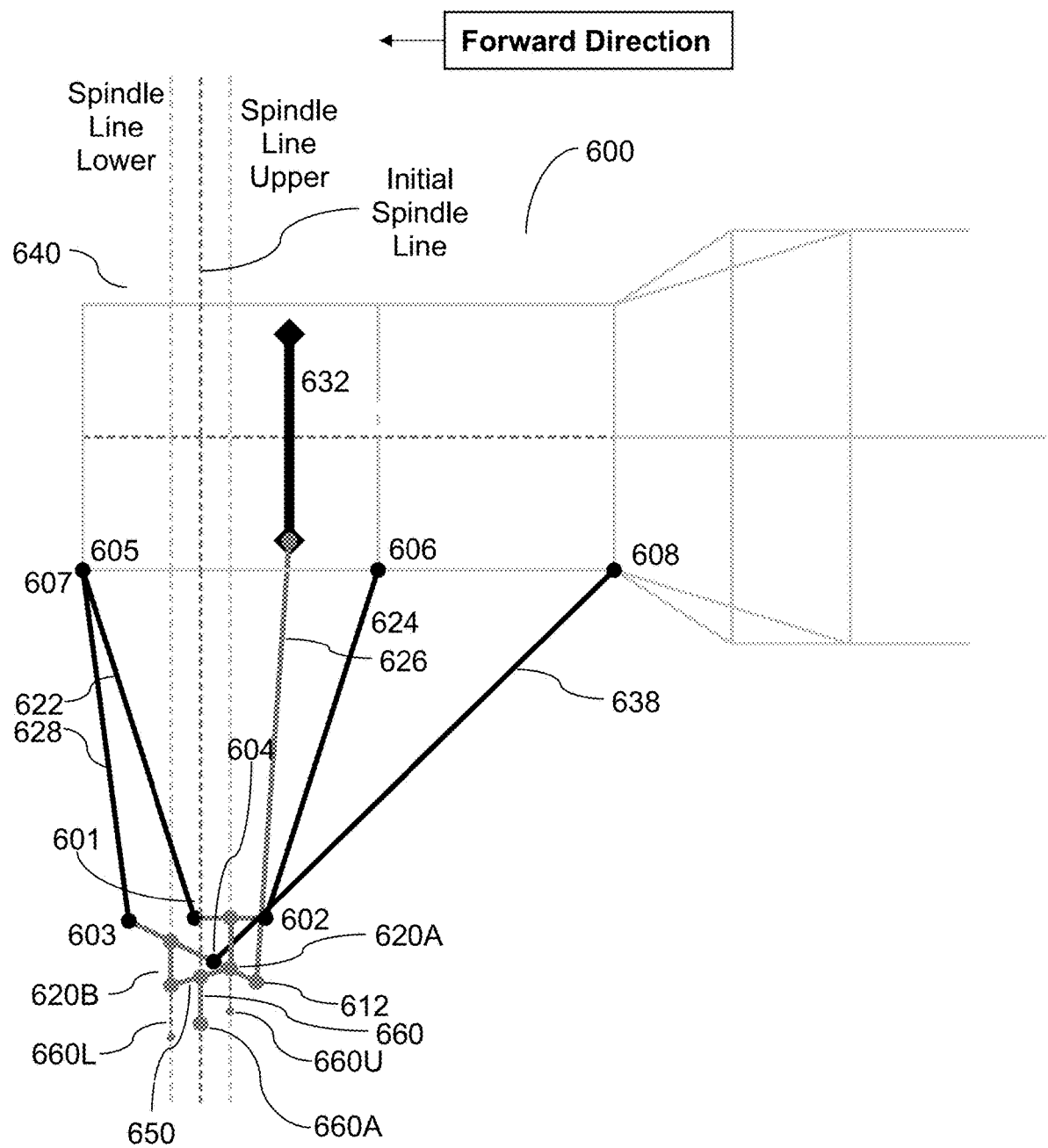
FIG. 6B illustrates a top view of a diagram of the front suspension of FIG. 6A turning zero degrees.

FIG. 6B illustrates an overhead view of the suspension 600 turning zero degrees.

Figure 6C:
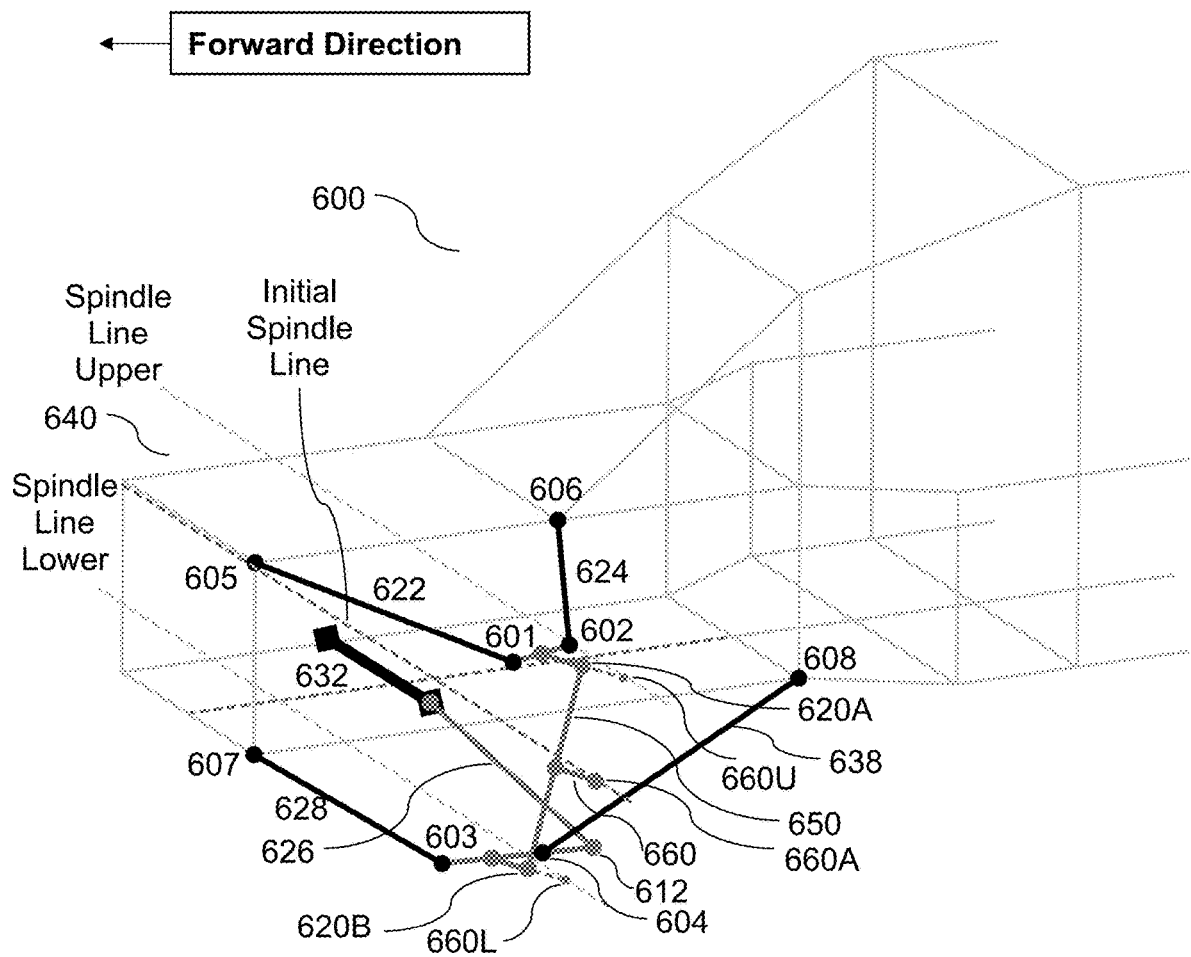
FIG. 6C illustrates an isometric view of a diagram of the front suspension of FIG. 6A turning left 20 degrees.

FIG. 6C illustrates an overhead view of the suspension 600 turning left 20 degrees. As can be seen, as the wheel turns, the instant centers IC1, IC2 move to the left and away from the spindle lines. Importantly, the triangle formed by points 601, 602, 660U and the triangle formed by points 603, 604, 660L both still comprise an isosceles triangle or approximately so, with line 601-660U and line 602-660U being approximately equal and line 603-660L and line 604-660L being approximately equal.

Furthermore, as can be seen, the wheel centerline point 660A remains on or within 2.0 cm, and ideally within 6 mm over a +/−30 deg steering range, of the upper initial spindle line and has traveled along the initial spindle line away from chassis 640 when compared with FIG. 6A.

Figure 6D:
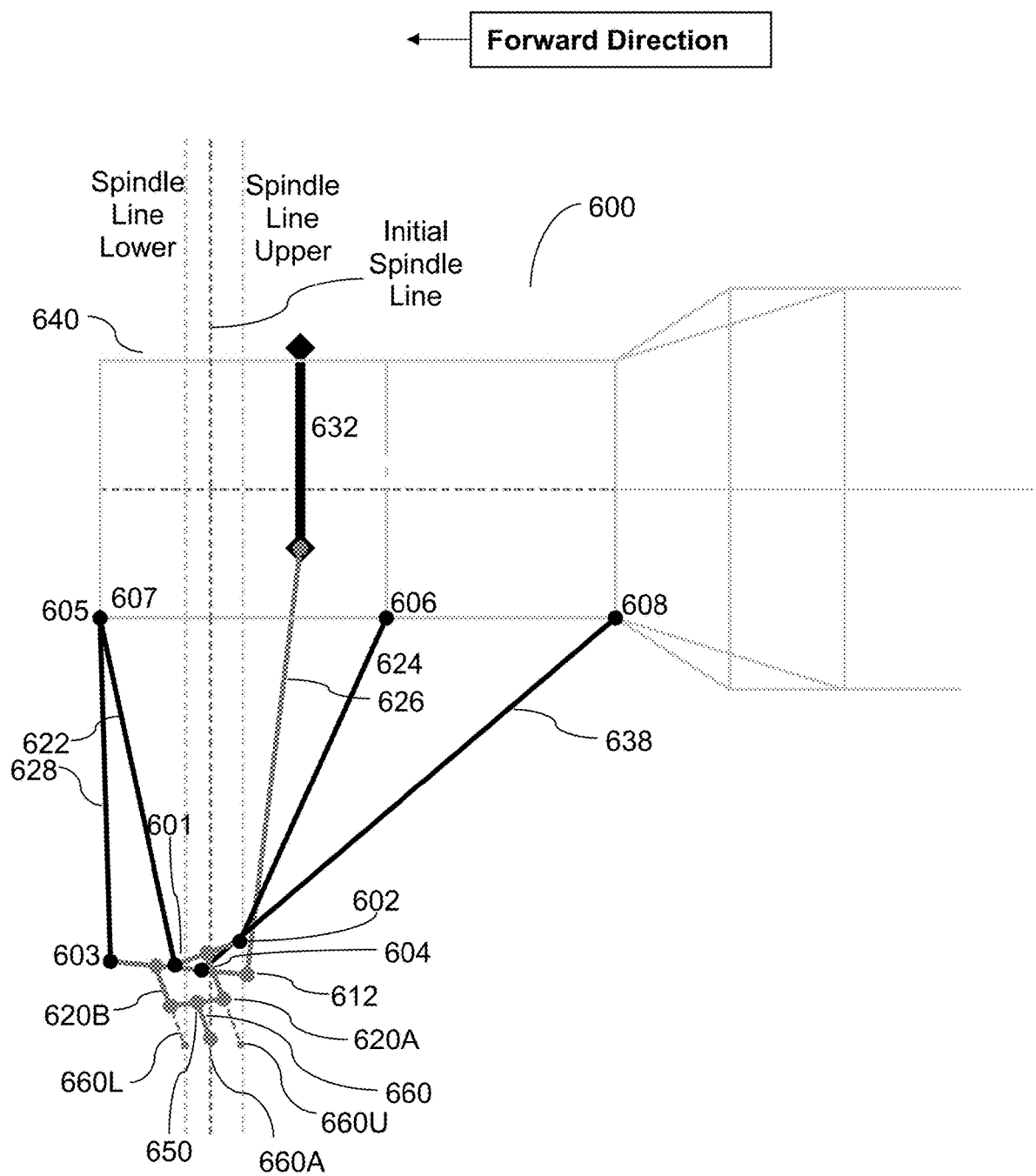
FIG. 6D illustrates a top view of a diagram of the front suspension of FIG. 6A turning left 20 degrees.

FIG. 6D illustrates an overhead view of the suspension 600 turning left 20 degrees.

Figure 6E:
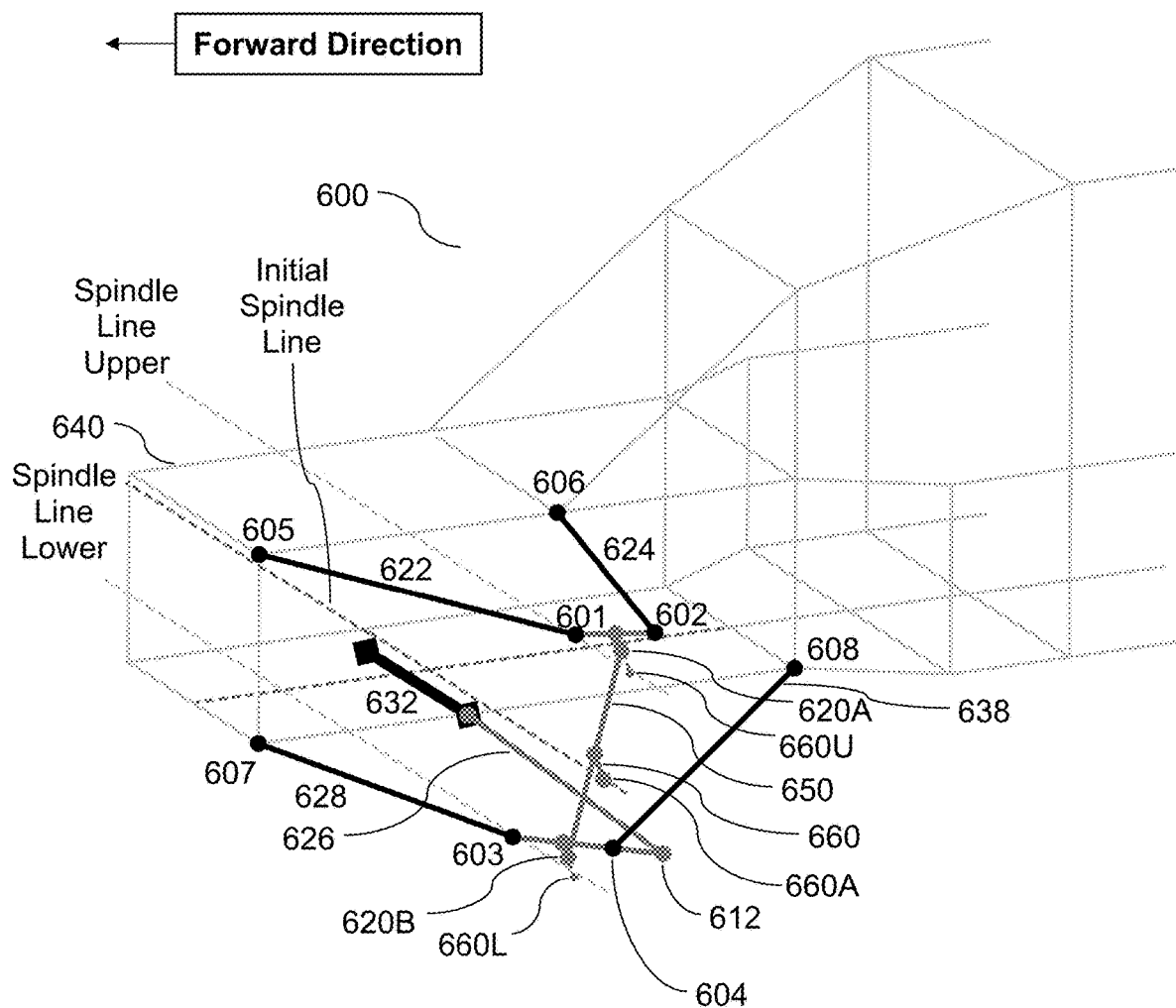
FIG. 6E illustrates an isometric view of a diagram of the front suspension of FIG. 6A turning right 20 degrees.
Figure 6F:
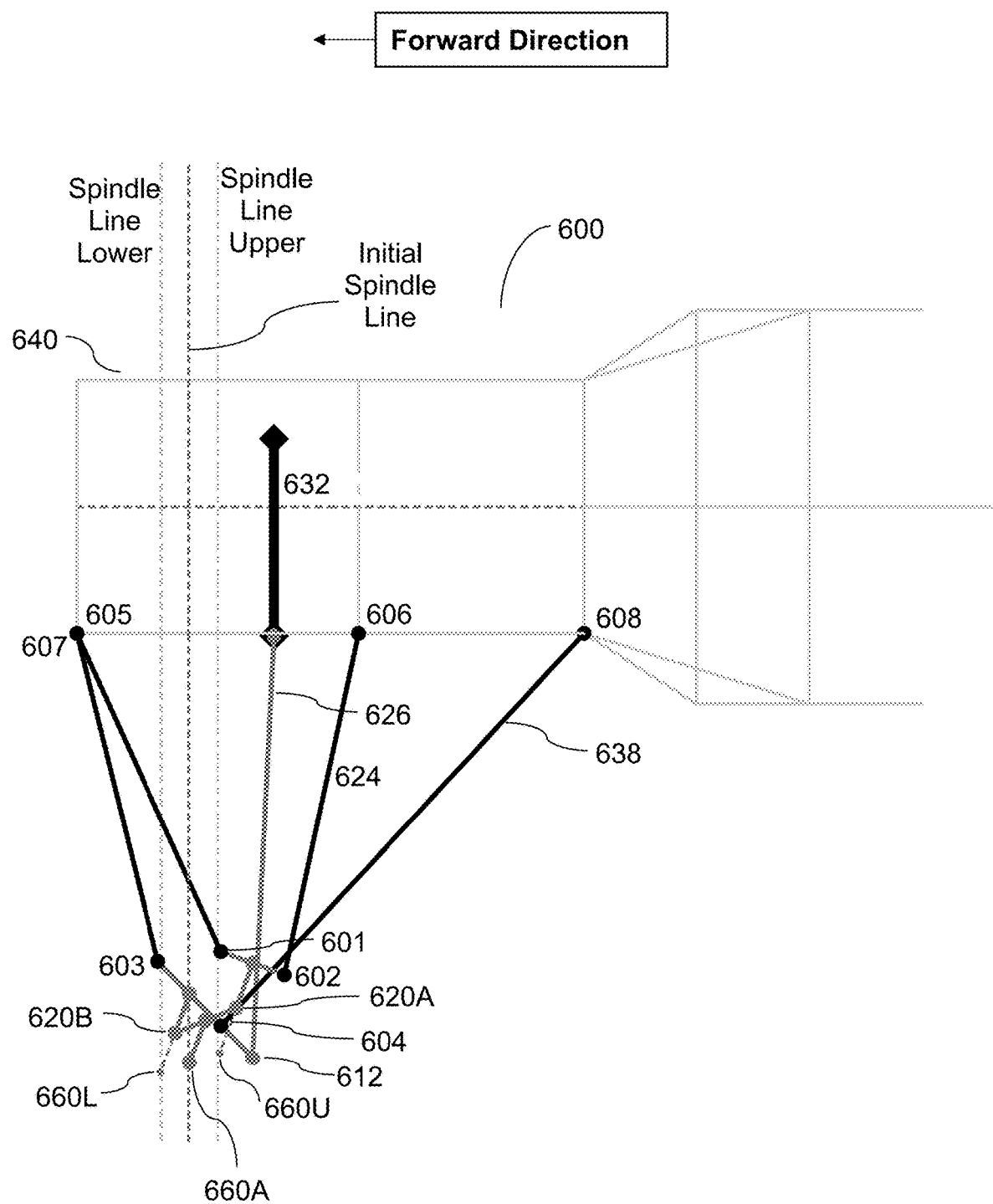
FIG. 6F illustrates a top view of a diagram of the front suspension of FIG. 6A turning right 20 degrees.

FIG. 6E illustrates an overhead view of the suspension 600 turning right 20 degrees. As can be seen, as the wheel turns right, the instant centers IC1, IC2 move to the right and away from the spindle lines. FIG. 6F illustrates an overhead view of the suspension 600 turning right 20 degrees. Importantly, the triangle formed by points 601, 602, 660U and the triangle formed by points 603, 604, 660L both still comprise an isosceles triangle or approximately so, with line 601-660U and line 602-660U being approximately equal and line 603-660L and line 604-660L being approximately equal.

Figure 6G:
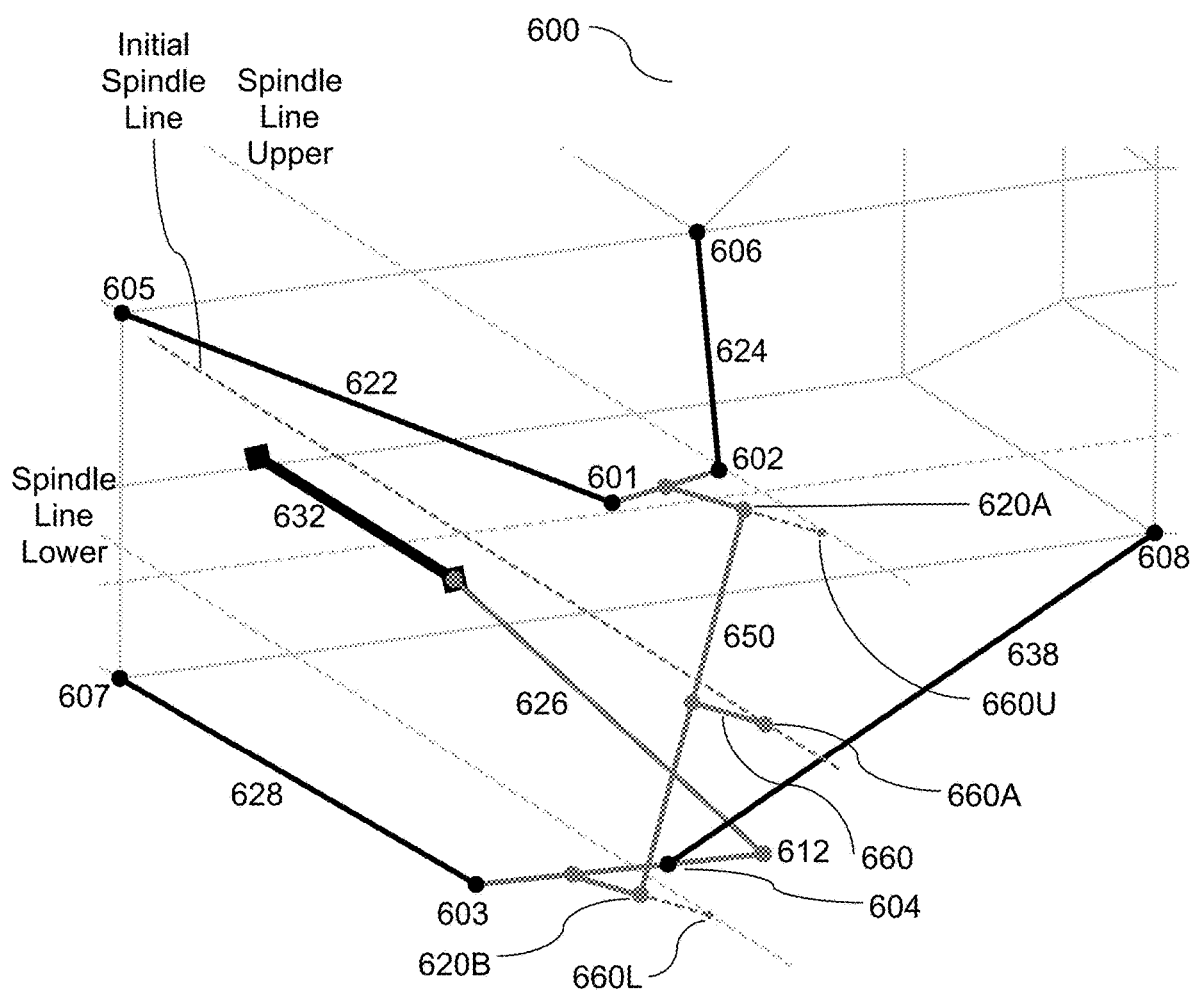
FIG. 6G illustrates an enlarged view of a portion of the suspension shown in FIG. 6C.

Furthermore, as can be seen, the wheel centerline point 660A remains on or within 2.0 cm, and ideally within 6 mm over a +/−30 deg steering range, of the upper initial spindle line and has traveled along the initial spindle line toward chassis 640 when compared with FIG. 6A. FIG. 6G is a blow up of FIG. 6C to better describe the position of the upper, lower, and initial spindle line.

Figure 7:
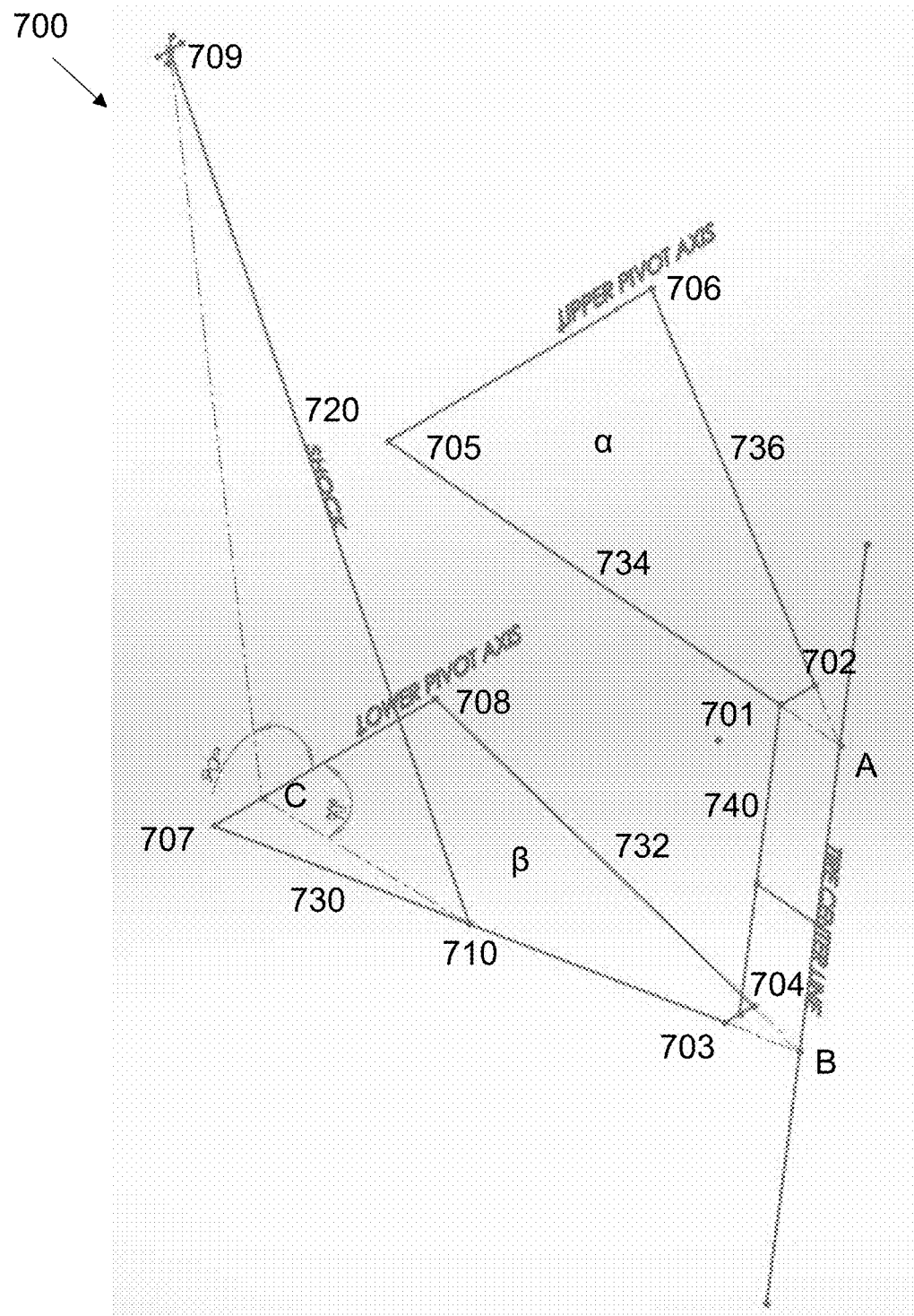
FIG. 7 illustrates a diagram of another embodiment of a suspension.

In the embodiments discussed herein, a spring damper assembly 720 is preferably coupled directly or indirectly (e.g., using a linkage rod) to one of the links such as shown in FIG. 7. The spring damper assembly 720 can include the spring damper system as well as any linkage rods used to couple the spring damper assembly to a linkage, trunnion, chassis, or other component of the vehicle. The spring damper assembly 720 preferably can move with the link to which it connects as the link moves.

As shown in FIG. 7, the spring damper assembly 720 is mounted to a front, lower link 730 but may alternatively be coupled to a back, lower link 732, a front, upper link 734, a back, upper link 736, or a trunnion disposed between two of the linkages (e.g., the two upper links 734, 736 or the two lower links 730, 732). Such configuration is further described in co-pending U.S. patent application having Ser. No. 17/144,654, filed on Jan. 8, 2021 and U.S. patent application having Ser. No. 17/499,778 filed on Oct. 12, 2021. In such embodiments, it is preferred that the trunnion is rotatably extensible with respect to the two links to which it mounts, meaning that the trunnion can pivot or move with respect to each of the two links.

Whether mounted to one of the lower links 730, 732, one of the upper links 734, 736, in between the lower links 730, 732 or the upper links 734, 736 or otherwise, it is critical that an angular relationship is maintained between the spring damper assembly 720 and the lower or upper pivot axis, depending upon where the spring damper assembly 720 is mounted. This is especially true in vehicles where the links 730, 732, 734, 736 may travel a distance of greater than six inches (e.g., 6 inches, 12 inches, 18 inches, etc.), for example, as the total distance the links 730, 732, 734, 736 may travel from a low point to a high point necessitates similar movement of the spring damper assembly 720. As used herein, the term "lower pivot axis" refers to the axis or line that intersects both points at which each of the lower linkages connect to the chassis, such as shown in FIG. 7. Thus, as shown in FIG. 7, the lower pivot axis is defined by a line intersecting the two points 707, 708 at which each of the two lower links 730, 732 couple to the chassis of the vehicle.

FIG. 7 illustrates a suspension 700 having a pair of upper links 734, 736 and a pair of lower links 730, 732 and a spring damper assembly 720. The front, upper link 734 is defined by the line extending between points 701 and 705 (line 701-705), with point 701 being where the front, upper link 734 couples with the knuckle 740 and point 705 being where the front, upper link 734 couples with the chassis. A back, upper link 736 is defined by the line extending between points 702 and 706 (line 702-706), with point 702 being where the back, upper link 736 couples with the knuckle 740 and point 706 being where the back, upper link 736 couples with the chassis. Point A is the instant center where line 701-705 and line 702-706 converge. Plane a is defined as intersecting each of points 701, 702, 705, 706 which also intersects point A.

A front, lower link 730 is defined by the line extending between points 703 and 707 (line 703-707), with point 703 being where the front, lower link 730 couples with the knuckle 740 and point 707 being where the front, lower link 730 couples with the chassis. A back, lower link 732 is defined by the line extending between points 704 and 708 (line 704-708), with point 704 being where the back, lower link 732 couples with the knuckle 740 and point 708 being where the back, lower link 732 couples with the chassis. Point B is the instant center where line 703-707 and line 704-708 converge. Plane 13 is defined as intersecting each of points 703, 704, 708, 707 which also intersects point B.

In addition to the above concerning the angular relationships between the spring damper assembly and the lower pivot axis, it is critical that the triangle formed by points 701, 702, and A and the triangle formed by points 703, 704, and B each comprises an isosceles triangle or approximately so, with line 701-A and line 702-A being approximately equal and line 703-B and line 704-B being approximately equal. This specific relationship of isosceles triangles allows for a mechanical bind to be created that eliminates external feedback to the steering wheel as the wheel travels or encounters obstacles due to an arcuate telescoping configuration.

As used above, the term approximately is defined to mean within 2 cm difference, so if two lines are approximately equal, this means their lengths are within 2 cm of one another. The variation of the lengths of the lines forming the isosceles or near-isosceles triangle will depend on the length of line 705-706 or line 707-708, or the distance between the points where the two upper links 734, 736 or two lower links 730, 732 couple to the chassis. As a distance between the points becomes greater, less variance will be tolerated.

In addition, it is important that line 701-705 and line 702-706 converge at point A, and point A is preferably within one inch of a center of the tire on the knuckle. Similarly, it is important that line 703-707 and line 704-708 converge at point B, and point B is preferably also within one inch of a center of the tire on the knuckle 740. The embodiments discussed herein disclose using an arcuate telescoping effect to control camber gain during steering such that track width would not change, when measured at the tire contact patch.

Figure 8A:
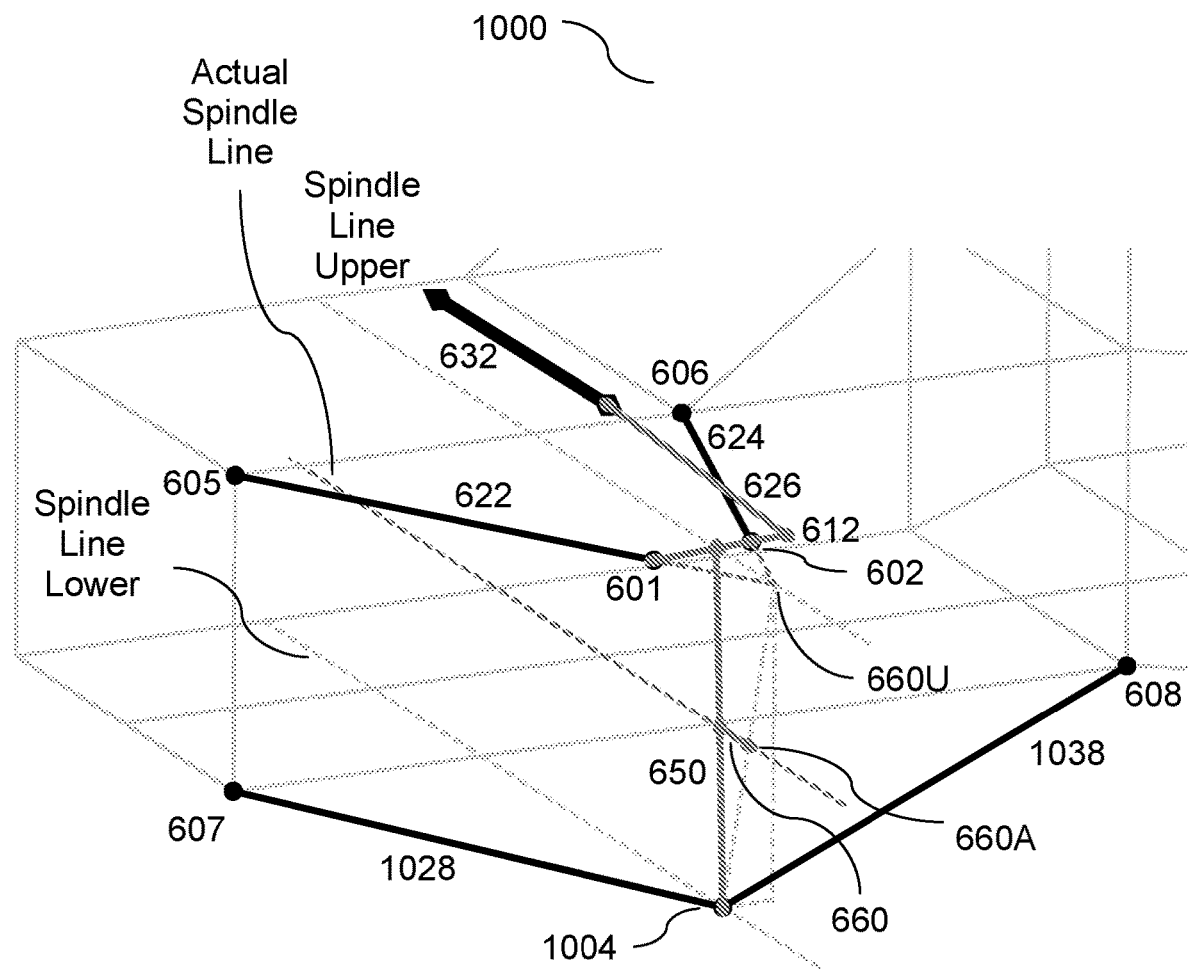
FIG. 8A illustrates an isometric view of a diagram of another embodiment of a front suspension.
Figure 8B:
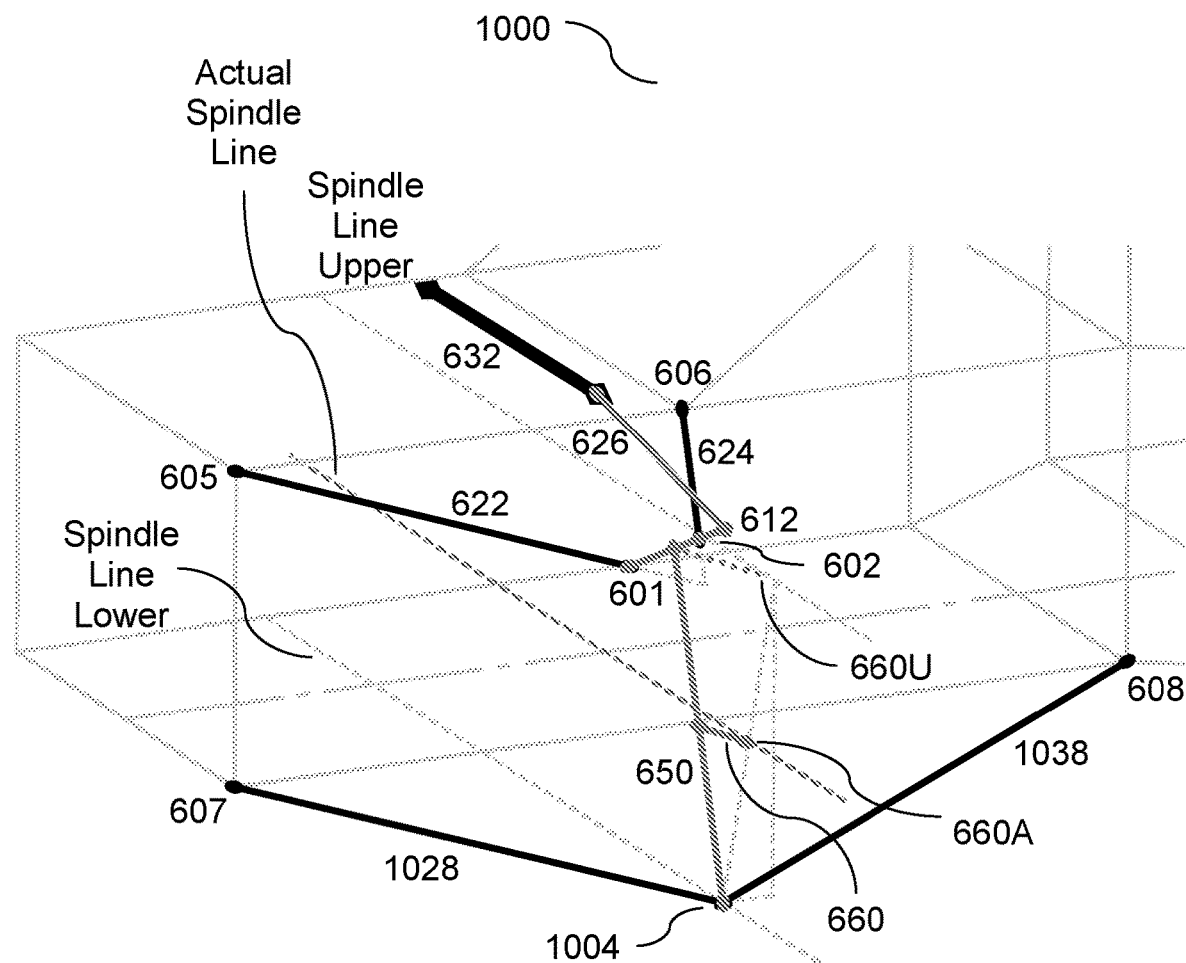
FIG. 8B illustrates an isometric view of a diagram of the front suspension of FIG. 8A turning left 20 degrees.
Figure 8C:
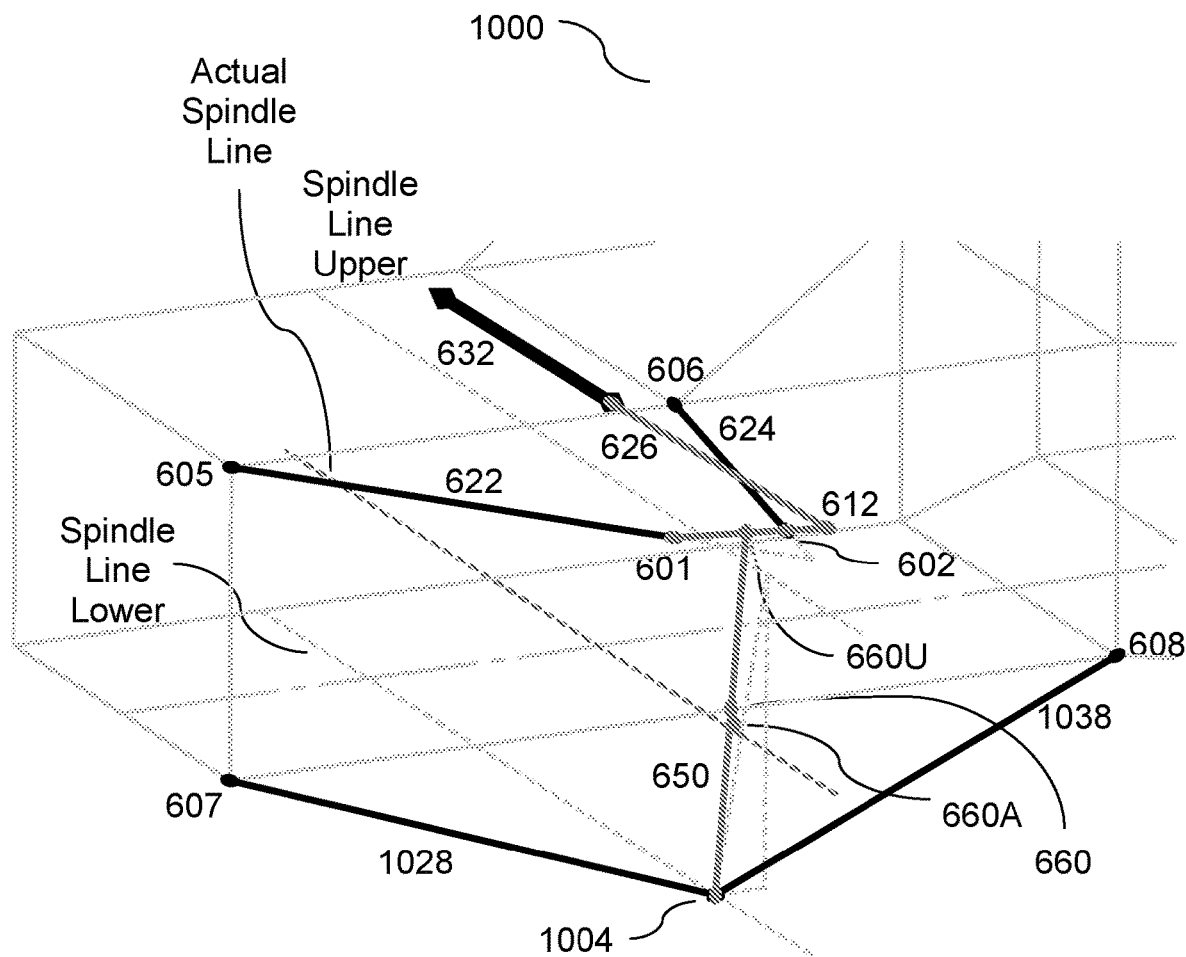
FIG. 8C illustrates an isometric view of a diagram of the front suspension of FIG. 8A turning right 20 degrees.

In FIGS. 8A-8C, the upper and lower parts of another embodiment of a front suspension 1000 is depicted. Front suspension 1000 is similar to suspension 600 shown in FIG. 6A but the lower links 1028, 1038 form an A-arm rather than be independently movable links 628, 638.

FIG. 8A illustrates an isometric view of the suspension 1000 turning zero degrees (i.e., wheel straight ahead). The suspension 1000 comprises a multi-link system. A first upper link 622 is defined by the line extending between points 601 and 605, with point 601 being where the first upper link 622 couples with the upright 650 and point 605 being where the first upper link 622 couples with the chassis. A second upper link 624 is defined by the line extending between points 602 and 606, with point 602 being where the second upper link 624 couples with the upright 650 and point 606 being where the second upper link couples with the chassis. The suspension inboard attachment or pickup points are defined by points 605, 606.

As mentioned above, a first lower link 1028 and a second lower link 1038 define an A-arm, where the first lower link extends between points 1004 and 607, with point 1004 being where the first lower link 1028 couples with the upright 650 and point 607 being where the first lower link 1028 couples with the chassis. The second lower link 1038 extends between points 1004 and 608, with point 1004 being where the second lower link 1038 couples with the upright 650 and point 608 being where the second lower link 1038 couples with the chassis.

A tie rod 626 connects the upright 650 at point 612 to the steering rack 632 to allow steering of the wheel of the vehicle.

A first instant center IC1 (not pictured) is the hypothetical point where hypothetical lines extending along each of the first upper link 622 and the second upper link 624 converge.

As discussed in more detail above, it is critical that the triangle formed by points 601, 602 and 660U comprises an isosceles triangle or approximately so, with line 601-660U and line 602-660U being approximately equal. Point 660U is the design terminus of an upper spindle.

FIG. 8B illustrates an overhead view of the suspension 1000 turning left 20 degrees. As can be seen, as the wheel turns, the instant center IC1 moves to the left and away from the upper spindle line. Importantly, the triangle formed by points 601, 602, 660U still comprises an isosceles triangle or approximately so, with line 601-660U and line 602-660U being approximately equal. Furthermore, as can be seen, the wheel centerline point 660A remains on or within 2.0 cm, and ideally within 6 mm over a +/−30 deg steering range, of the actual spindle line and has traveled along the spindle line away from the chassis when compared with FIG. 8A.

FIG. 8C illustrates an overhead view of the suspension 1000 turning right 20 degrees. As can be seen, as the wheel turns right, the instant center IC1 moves to the right and away from the upper spindle line. Importantly, the triangle formed by points 601, 602, 660U still comprises an isosceles triangle or approximately so, with line 601-660U and line 602-660U being approximately equal. Furthermore, as can be seen, the wheel centerline point 660A remains on or within 2.0 cm, and ideally within 6 mm over a +/−30 deg steering range, of the upper initial spindle line and has traveled along the initial spindle line toward the chassis when compared with FIG. 8A.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

Unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value with a range is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A suspension system for a vehicle, comprising:
a plurality of independently movable links comprising at least a first link and a second link, wherein a first end of the first link is coupled to a chassis of the vehicle and a second end of the first link is coupled to a knuckle at a first point, and wherein a first end of the second link is coupled to the chassis and a second end of the second link is coupled to the knuckle at a second point, wherein the first point is different from the second point, and wherein the first and second links may move or pivot independently of one another;
wherein the knuckle comprises a tire having a wheel center line point;
wherein an instant center is a point where hypothetical lines extending along each of the first link and the second link converge, and wherein a first distance between the first point and the instant center is approximately equal to a second distance between the second point and the instant center.

2. The suspension system of claim 1, wherein the first point, the second point and the instant center define an isosceles triangle.

3. The suspension system of claim 1, wherein a first plane intersects the first point, the second point, the instant center, a third point where the first link couples to the chassis and a fourth point where the second link couples to the chassis.

4. The suspension system of claim 1, further comprising:
a third link and a fourth link, wherein a first end of the third link is coupled to the chassis and a second end of the third link is coupled to the knuckle at a third point, and wherein a first end of the fourth link is coupled to the chassis and a second end of the fourth link is coupled to the knuckle at a fourth point;
wherein a second instant center is a point where hypothetical lines extending along each of the third link and the fourth link converge, and wherein a third distance between the third point and the second instant center is approximately equal to a fourth distance between the fourth point and the second instant center.

5. The suspension system of claim 4, wherein the third point, the fourth point and the second instant center define an isosceles triangle.

6. The suspension system of claim 4, wherein a second plane intersects the third point, the fourth point, the second instant center, a fifth point where the third link couples to the chassis and a sixth point where the fourth link couples to the chassis.

7. The suspension system of claim 4, wherein the first and second links comprise upper links connected to the knuckle at or above a vertical center of the knuckle, and wherein the third and fourth links comprise lower links connected to the knuckle at or below the vertical center of the knuckle.

8. The suspension system of claim 7, wherein the third and fourth links collectively comprise an A-arm.

9. The suspension system of claim 1, wherein the second end of the first link is coupled to the knuckle at the first point via a first spherical joint such that the first link can spherically rotate, and wherein a second end of the second link is coupled to the knuckle at a second point via a second spherical joint such that the link can spherically rotate.

10. The suspension system of claim 9, wherein the first link is coupled to the chassis and knuckle independently of the second link.

11. A suspension system for a vehicle, comprising:
a plurality of links comprising at least a first link and a second link, wherein a first end of the first link is coupled to a chassis of the vehicle and a second end of the first link is coupled to a knuckle at a first point, and wherein a first end of the second link is coupled to the chassis and a second end of the second link is coupled to the knuckle at a second point;
wherein the knuckle comprises a tire having a wheel center line point; and
wherein the wheel centerline point remains within (i) 7.0% of a width or distance between a set of inboard pickup points where the first and second links couple to the chassis or (ii) 2.0 cm over a +/−30 deg steering range, of an initial spindle line as the knuckle is rotated.

12. The suspension system of claim 11, wherein the wheel centerline point remains within (i) 2.5% of the width or distance between the set of inboard pickup points where the first and second links couple to the chassis or (ii) 6 mm over the +/−30 deg steering range, of the initial spindle line as the knuckle is rotated.

13. The suspension system of claim 11, wherein a distance between the first point and the wheel centerline point is approximately equal to a distance between the second point and the wheel centerline point.

14. The suspension system of claim 11, wherein the initial spindle line is perpendicular to the chassis and defined when the knuckle is steered at 0 degrees.

15. The suspension system of claim 11, wherein the first point, the second point and the wheel centerline point define an isosceles triangle.

16. The suspension system of claim 11, wherein a first plane intersects the first point, the second point, the wheel centerline point, a third point where the first link couples to the chassis and a fourth point where the second link couples to the chassis.

17. The suspension system of claim 11, wherein the plurality of links further comprises:
a third link and a fourth link;
wherein a first end of the third link is coupled to the chassis and a second end of the third link is coupled to the knuckle at a third point;
wherein a first end of the fourth link is coupled to the chassis and a second end of the fourth link is coupled to the knuckle at a fourth point;
wherein a distance between the third point and the wheel centerline point is approximately equal to a distance between the fourth point and the wheel centerline point.

18. The suspension system of claim 17, wherein the third point, the fourth point and the wheel centerline point define an isosceles triangle.

19. The suspension system of claim 17, wherein a second plane intersects the third point, the fourth point, the wheel centerline point, a fifth point where the third link couples to the chassis and a sixth point where the fourth link couples to the chassis.

20. The suspension system of claim 17, wherein the first and second links comprise upper links connected to the knuckle above a vertical center of the knuckle and the third and fourth links comprise lower links connected to the knuckle below the vertical center of the knuckle.

21. The suspension system of claim 17, wherein the third and fourth links collectively comprise an A-arm.

22. The suspension system of claim 11, wherein the first link pivots or moves independently of the second link.

* * * * *